(12) United States Patent
Sako et al.

(10) Patent No.: US 6,281,961 B1
(45) Date of Patent: *Aug. 28, 2001

(54) DEVELOPING DEVICE WITH MECHANISM FOR SMOOTHLY CIRCULATING DEVELOPER

(75) Inventors: Mineyuki Sako; Suguru Hamamichi, both of Toyokawa; Shinichi Yoshimoto, Aichi-ken; Yoshihiro Shojo, Itami; Yukihiko Okuno, Toyokawa, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/229,681

(22) Filed: Jan. 13, 1999

(30) Foreign Application Priority Data

| Jan. 14, 1998 | (JP) | 10-005504 |
|---|---|---|
| Jan. 14, 1998 | (JP) | 10-005511 |
| Jan. 29, 1998 | (JP) | 10-016755 |
| Jan. 29, 1998 | (JP) | 10-016759 |
| Feb. 4, 1998 | (JP) | 10-022455 |
| Feb. 12, 1998 | (JP) | 10-029009 |

(51) Int. Cl.$^7$ ............................. G03B 27/32; G03G 15/08
(52) U.S. Cl. ............................. 355/27; 399/254; 399/256
(58) Field of Search ............................. 355/27; 399/254, 399/255, 256, 258, 260

(56) References Cited

U.S. PATENT DOCUMENTS

| 5,347,353 | 9/1994 | Fletcher . |
| 5,477,250 | 12/1995 | Larson . |
| 5,581,337 | * 12/1996 | Suzuki ........................... 355/260 |
| 5,682,583 | * 10/1997 | Ito et al. ........................ 399/254 |
| 5,950,056 | * 9/1999 | Hamamichi et al. ............ 399/256 |
| 5,960,246 | * 9/1999 | Kasahara et al. ............... 399/359 |
| 5,963,766 | * 10/1999 | Okuno et al. .................. 399/256 |
| 6,122,472 | * 9/2000 | Sako et al. ..................... 399/254 |

FOREIGN PATENT DOCUMENTS

| 05333691 | 12/1993 | (JP) . |
| 06051634 | 2/1994 | (JP) . |

* cited by examiner

Primary Examiner—Russell Adams
Assistant Examiner—Peter B. Kim
(74) Attorney, Agent, or Firm—McDermott, Will & Emery

(57) ABSTRACT

In a vertical type developing device in which plurality of screws are arranged up and down, developer transported by an upper developer transporting screw and developer transported by lower developer transporting screw are properly dispersed. Thereby, developer flows smoothly and further stirs and mixes. As means of it, the followings are included: (1) between the upper screw and the lower screw, properly adjusting developer transporting capabilities and dispersing pressures; (2) arrangement of dispersing members between the upper and lower developer transporting screws; (3) arrangement of openings at a partition wall; (4) arrangement of a developer reservoir portions to a developer accommodating unit; or the like.

39 Claims, 42 Drawing Sheets

74, 216, 36

76, 32

51

51

PRIOR ART

DEVELOPING DEVICE WITH MECHANISM FOR SMOOTHLY CIRCULATING DEVELOPER

This application is based on applications Nos. 10-005504, 10-005511, 10-016755, 10-016579, 10-022455 and 10-029009 filed in Japan, the contents of which are hereby incorporated by reference.

BACKGROUND OF THE INVENTION

1. Field of the Invention

The present invention relates to a developing device used for electrophotographic type copiers and printers. More particularly, it relates to a developing device of a vertical circulation type wherein each screw is arranged up and down or upper, middle, and lower so that developer should circulate smoothly and unevenness of toner-density problem should be solved quickly.

2. Description of the Related Art

As an example of a conventional developing device of vertical circulation type, Japanese Unexamined Patent Publication No. 5-333691 here will be referred to. FIGS. 44 and 45 illustrate the structure of a conventional developing device disclosed in the publication. In a developing device 900 according to the publication, a developer reservoir 903 for supplying and a developer reservoir 906 for stirring are arranged up and down. A partition wall 904 is arranged between the developer reservoir 903 and the developer reservoir 906 whereby the partition wall 904 separates the developer reservoirs 903 and 906.

An upper auger 902 is arranged in the developer reservoir 903 and transports developer from left to right in FIG. 45. A lower auger 905 is arranged in the developer reservoir 906 and transports developer from right to left in FIG. 45. That is, transporting direction of the auger 902 and that of the auger 905 are opposite to each other.

The lower auger 905 delivers developer to the upper auger 902 at downstream end 911 for the developer reservoir 906. The upper auger 902 delivers developer to the lower auger 905 at downstream end 912 for the developer reservoir 903. Thereby, developer is circulated clockwise in FIG. 45 and stirred. As apparent from FIG. 44, the upper auger 902 supplies developer to a developer carrier 907. Then, the lower auger 905 collects developer remaining on the developer carrier 907 after development.

However, the developing device 900 has the following problems.

Firstly, in the developing device 900, the relation between developer-transporting capability of the upper auger 902 and that of the lower auger 905 is not considered at all. Therefore, there is a fear that the balance between developer-transporting capability of the upper auger 902 and that of the lower auger 905 may not be found. When developer-transporting capabilities of the augers 902 and 905 do not find a balance, developer does not circulate smoothly. Thereby, developer receives an excessive load and developer is likely to deteriorate soon. Also, thereby, distribution of developer within the developing device becomes imbalance and image-density may be uneven.

Secondly, in the developing device 900, both the developer reservoirs 903 and 906 are separated by the partition wall 904 except the downstream ends 911 and 912. Thereby, portions where the augers 902 and 905 can deliver developer to each other are limited to the downstream ends 911 and 912. Therefore, developer circulates clockwise only, in actual. That is, developer can hardly move from one of the augers to other auger while being transported horizontally by the augers 902 and 905.

Thus, in case that toner-density of developer becomes uneven at some parts, developer keeps circulating for some time with its toner-density uneven. In other words, it takes time for developer to recover from unevenness of toner-density in the clockwise circulation. This also causes unevenness of image-density.

Thirdly, as described, since portions where developer can be delivered up and down are limited to the downstream ends 911 and 912, balance of developer to be delivered between the upper auger and the lower auger is lost in case that the developing device 900 is not installed horizontally. As a result, developer is likely to concentrate in either the developer reservoir 903 or the developer reservoir 906. Thereby, a motor M for driving the augers 902 and 905 has a large load and problem such as step-out occurs to the motor M.

SUMMARY OF THE INVENTION

To overcome the above mentioned problems in the conventional developing device, the primary object of the present invention is to provide an improved developing device. Further object of the present invention is to provide a developing device capable of circulating developer smoothly. Still further object of the present invention is to provide a developing device which can quickly make toner density uniform when toner-density varies and becomes uneven at some parts.

To achieve at least one of the objects, a developing device according to one aspect of the present invention comprises: an accommodating unit which accommodates developer therein, the developer being a mixture of toner and carrier; a first transporter which is located in the accommodating unit, the first transporter being for transporting the developer, the first transporter having a first transporting capability; and a second transporter which is located in said accommodating unit and is located above of the first transporter, the second transporter being for transporting the developer, the second transporter having a second transporting capability higher than the first transporting capability.

In the above mentioned developing device, since the second transporter has higher transporting capability than the first transporter, the second transporter transports developer faster than the first transporter. Therefore, distribution balance of developer is kept in a state that amount of developer present within the second transporter is less than that of developer present within the first transporter. Accordingly, the second transporter located above of the first transporter does not have to be buried in developer completely. That is, since total amount of toner to be accommodated in the accommodating unit is made not much, torque for driving the first and second transporters is reduced. Moreover, since developer does not receive serious stress due to its own weight, a life of developer becomes long.

In the present specification, term "transporter" means any elements which transport developer in a certain direction. Terms "screw" and "auger" are lower conception of "transporter". The terms "screw" and "auger" are synonyms and defined as an element which includes a long rod with at least one blade and transports developer in longitudinal direction of the rod along with its axial rotation, herein. A blade may be arranged on a rod in its longitudinal direction spirally.

As to the first and second transporters, first and second augers can be employed. In this case, making transporting capability of the second auger higher than that of the first auger can be achieved by employing any one of the followings: (1) the rotation speed of the second auger is made faster than that of the first auger; (2) the blade-diameter of the second auger is made larger than that of the first auger; (3) the pitch of the second auger is made larger than that of the first auger; (4) the number of threads of the second auger is made larger than that of the first auger; (5) a paddle is provided on the first auger; (6) the axial diameter of the first auger is made larger than that of the second auger; and so on. A paddle of an auger herein is defined as a member which is designed to apply pressure only in a direction vertical to a developer-transporting direction, i.e., a normal direction of the developer-transporting direction: the paddle is not designed to impart transporting force to developer (pressure in an axial direction).

The accommodating unit of the developing device may have a first end and a second end opposing the first end. The first transporter may transport the developer from the first end to the second end, and deliver the developer to the second transporter at the second end. Similarly, the second transporter may transport the developer from the second end to the first end, and deliver the developer to the first transporter at the first end.

More preferably, the accommodating unit has a space through which developer is able to pass between the first transporter and the second transporter. The space is located between the first end and the second end. Thereby, toner can be transferred from one of the transporters to the other transporter while being transported horizontally. As a result, toner-density of developer is quickly made uniform.

According to another aspect of the present invention, the developing device comprises: an accommodating unit which accommodates developer therein, the developer being a mixture of toner and carrier, the accommodating unit having a first end and a second end opposing the first end; a first transporter which is located in the accommodating unit to transport the developer from the first end to the second end; and a second transporter, which is located in the accommodating unit and is located above of the first transporter to transport the developer from the second end to the first end, wherein at an area between the first end and the second end, a fist pressure to transfer developer from the second transporter to the first transporter is larger than a second pressure to transfer developer from the first transporter to the second transporter.

In this developing device, within the area, developer being transported by the second transporter transfers to the first transporter gradually while being transported. Thus, since developer transfers gradually while transported by the second transporter, dispersibility of developer gets better. Thereby, even though toner-density of developer becomes uneven, developer is mixed immediately and unevenness of toner is cleared. For example, such an effect can be seen immediately after replenishment of toner. Accordingly, development is carried out with developer which is sufficiently mixed, stirred, whereby toner disperses uniformly. As a result, fog on an image is prevented. So is smoke of toner.

In the inventive developing device, the area is preferably located closer to the first end than to the second end. In other words, the area is preferably located near downstream end of transporting direction for the second transporter. If the area is located at the other end, there is a fear that when toner is newly replenished, toner immediately after replenished transfers to the first transporter before stirred sufficiently. If this phenomenon occurs, toner not sufficiently charged is used for development, whereby fog on an image and smoke of toner occur as a result.

Each of the first and second transporter is preferably an auger. In this case, to make pressure to push and transfer the developer from one auger to other auger, any one of the followings can be employed: (1) a paddles is provided on an auger; (2) pitch of an auger is made small; (3) the number of threads of an auger is made large; and so on. Any one of (1), (2) and (3) may be adopted to the second auger more effectively within the area than outside the area. Alternatively, within the area, any one of (1), (2) and (3) may be adopted to the second auger more effectively than to the first auger.

Alternatively, according to further aspect of the present invention, a developing device for forming an image with toner comprises: an accommodating unit which accommodates developer therein, the developer being a mixture of toner and carrier, the accommodating unit having a first end and a second end opposing the first end; a first auger which is located in the accommodating unit, the first auger being capable of rotating in a first rotating direction to transport the developer along with a rotating axis of the first auger; and a second auger which is located in the accommodating unit and is located above of the first auger, the second auger being capable of rotating in a second rotating direction to transport the developer along with a rotating axis of the second auger, wherein the accommodating unit has at least one space through which the developer is substantially able to transfer between the first auger and the second auger, at least one space being located between the first end and the second end.

In this developing device, developer being transported by the first or second auger can transport to one of the other augers through one space between the first end and the second end. Thereby, developer being transported by the first auger and developer being transported by the second auger are further mixed and stirred. Therefore, even though toner-density becomes partially uneven, the unevenness of toner-density is cleared by next development. Thereby, even in a case that toner-density declines, which is likely to occur after a black-solid image has got developed, developer is never supplied to a developer carrier again in an uneven toner-density state. Therefore, deterioration of images caused by unevenness of toner-density is prevented.

Rotating direction of the first auger and that of the second auger may be either same or reverse. Especially, when these rotating directions are made same, flows of toner get entangled at portion where the first auger and the second auger face to each other, whereby developer further mixes.

Moreover, when phases of screw blades for the first auger and the second auger are set to be different, developer further mixes. Also, developer further mixes when axes of the first and second augers are arranged close to each other and screw blades of each auger come into spaces of screw blades for other auger.

Alternatively, arranging a dispersing member at the intermediate height of the first auger and the second auger may be also effective. The dispersing member may correspond to either a dispersing auger which transports developer in an axial direction to disperse developer or a guide member which regulates flow of developer. When a dispersing auger is used as a dispersing member, the dispersing auger is preferably arranged in a manner that developer-transporting direction of the dispersing auger is made reverse to that of the first auger.

In case a partition wall is arranged between the first auger and the second auger (except both ends of the augers), the partition wall preferably has an opening: developer passes through the opening, whereby developer is further mixed between the augers arranged up and down. When an opening is arranged on the partition wall, its opening area preferably occupies within a range between 10 and 50 percent of entire area of the partition wall.

Alternatively, according to still further aspect of the present invention, the developing device for forming an image with toner comprises: an accommodating unit which accommodates developer therein, the developer being a mixture of toner and carrier, the accommodating unit having a first end and a second end opposing the first end; a first transporter which is located in the accommodating unit, the first transporter transporting the developer from the first end to the second end; and a second transporter which is located in the accommodating unit and is located above of the first transporter, the second transporter transporting the developer from the second end to the first end, wherein the first transporter delivers the developer to the second transporter at the second end, and the second transporter delivers the developer to the first transporter at the first end, and wherein the accommodating unit has a space for storing an excessive amount of the developer in the accommodating unit.

In this developing device, level of developer accommodated in the accommodating unit is kept constant even when height of developer-bulk changes: a space absorbs height change of the developer-bulk. Thereby, even when developer-bulk changes, balance between amount of developer to be transported by the first transporter and that of developer to be transported by the second transporter is kept. Even when no partition wall is provided between the first and second transporters, there is no fear that circulation width of developer in longitudinal direction gets short. Thereby, developer is surely supplied to the entire longitudinal direction area of a developer carrier. Developer-bulk is likely to change when toner-density changes due to consumption or replenishment of toner.

The arrangement of the space at the first end brings the following advantages.

Operation of the developing device, in case where developer-bulk reduces and developer-level lowers, is assumed herein. When developer-level lowers, amount of developer to be transported by the first transporter becomes larger than that of developer to be transported by the second transporter. Therefore, developer begins to gather at the second end. Thereby, the developer gathering at the second end is moved from there, then the developer-level goes up to its original level. On the other hand, since developer is in short at the first end, circulation width of developer in a longitudinal direction gets short, as a result. Subsequently, developer supply becomes poor mainly at the first end. In case a space is arranged at the first end, toner can be replenished from the space to the first end, whereby the poor developer supply is avoided.

Moreover, in this case, the inventive developing device may employ a third transporter which is arranged in coaxial to the second transporter within the space and transports developer in reverse direction. Thereby, when developer-bulk reduces and developer is in short at the first end, developer can be replenished from the space to the first end through the third transporter.

Alternatively, a space extending from the first end to the second end may be arranged. In this case, a third transporter is arranged within the space and its axis may be located at a position higher than a position where axis of the second transporter is located. Thereby, the first or second transporter and the third transporter can form sub-circulation path of developer: when developer-bulk reduces, developer is replenished from the sub-circulation path.

DETAILED DESCRIPTION OF THE PREFERRED EMBODIMENTS

Embodiments of the present invention will be described in detail below with reference to the accompanying drawings. The following embodiments provide, in an electrophotographic type image forming device, a developing device used to develop an electrostatic latent image formed on a photosensitive drum.

[The First Embodiment]

Figure 1:
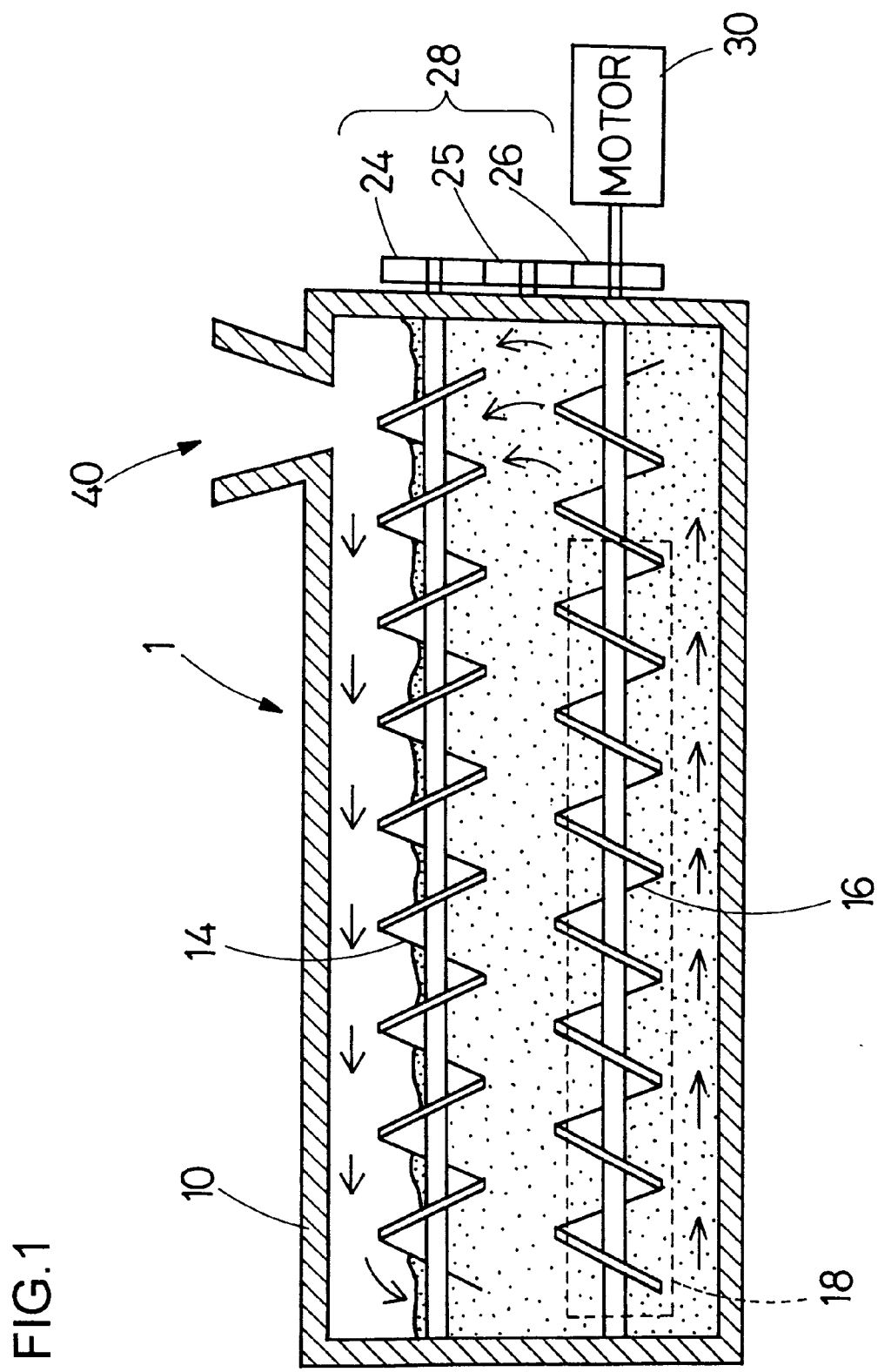
FIG. 1 is a cross sectional front view of a developing device according to the first embodiment.

The first embodiment will be explained. As shown in FIG. 1, a developing device 1 according to this embodiment has a developer accommodating unit 10 for accommodating developer. A stirring screw 14 and a supply screw 16 are arranged in parallel to each other inside the developer accommodating unit 10. These screws have rotatable axes and plurality of screw blades are arranged on the axes slantwise. Slanting direction of each screw blade is reverse to each other.

A group of gears 28 connects axis of the stirring screw 14 and that of the supply screw 16 outside the developer accommodating unit 10. Further, a motor 30 which is controlled by the main body of an image forming device is attached to one end of the axis for the supply screw 16. In the group of gears 28, the number of teeth of a gear 26 for the supply screw 16 is larger than that of a gear 24 for the stirring screw 14. Further, an intermediate gear 25 is disposed between the gear 26 and the gear 24. Thereby, the stirring screw 14 and the supply screw 16 is designed to rotate in same direction and at the same time, the stirring screw 14 is designed to rotate faster than the supply screw 16 when the motor 30 is rotated.

In the developer accommodating unit 10, about a half part of the stirring screw 14 arranged above of the supply screw 16 is buried with developer. That is, developer fills about eighty-percent volume of the developer accommodating unit 10. Since toner is consumed for development, a toner replenishing port 40 for replenishing toner to the developer accommodating unit 10 is provided at its upstream side (at upper-right in FIG. 1).

Figure 2:
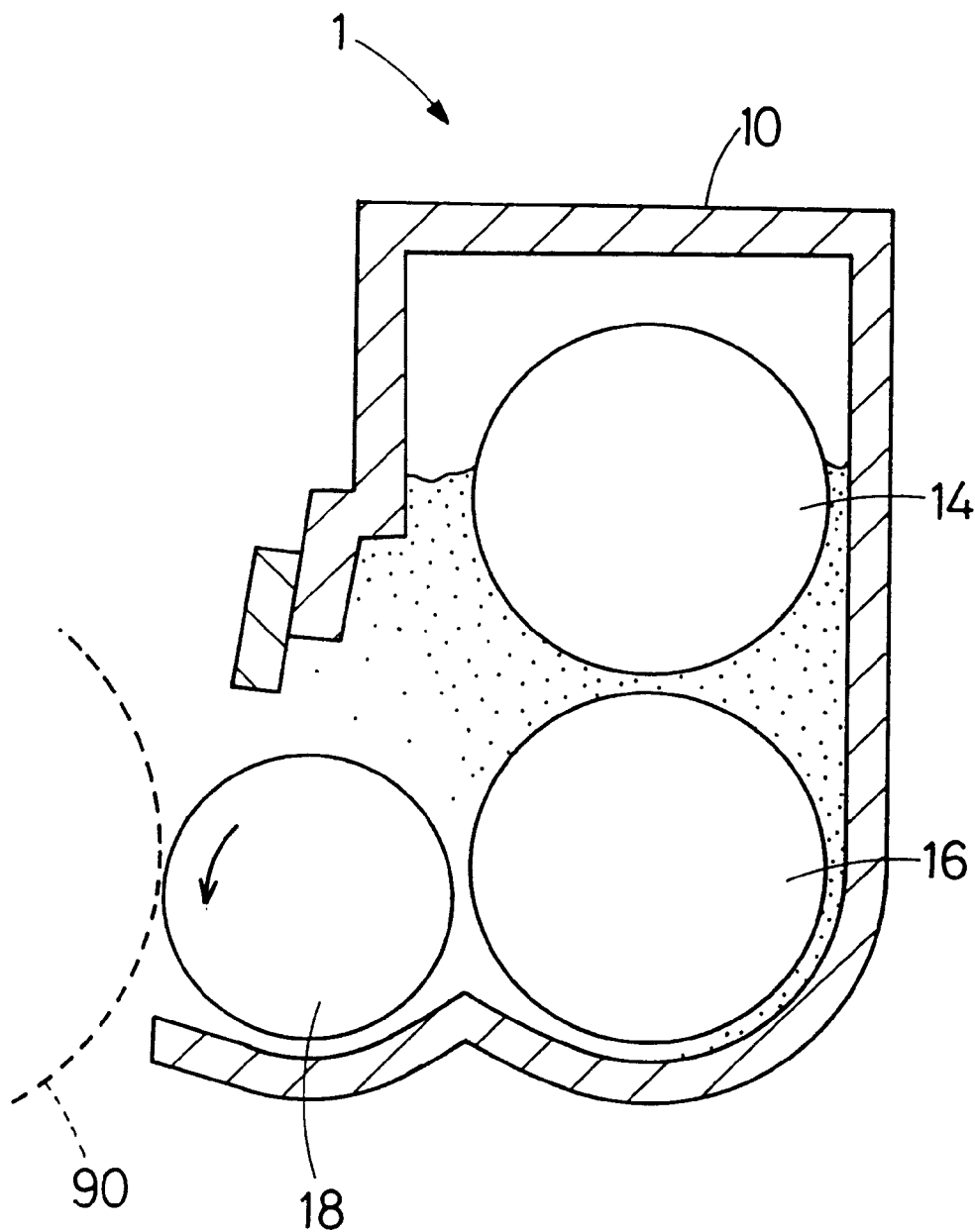
FIG. 2 is a cross sectional side view of a developing device according to the first embodiment.

As shown in FIG. 2, a cross sectional side view of the developing device 1, these two screws are arranged up and down: the stirring screw 14 is located at the top stage and the supply screw 16 is located at the bottom stage. Further, a development roller 18 is arranged at the same height of the supply screw 16 with a part of it protruding from the developer accommodating unit 10. The development roller 18 is arranged very close to a photosensitive drum 90 so that the development roller 18 can apply toner to an electrostatic latent image on the photosensitive drum 90 and thereby the image gets developed.

Next, operation of the developing device 1 will be explained. When the motor 30 is rotated by control of main body of the image forming device, the supply screw 16 arranged in coaxial to the motor 30 rotates. The rotation of the motor 30 is transmitted to the stirring screw 14 via the group of gears 28. The stirring screw 14 rotates faster than the supply screw 16 and its rotating direction is same as that of the supply screw 16. The rotations of the stirring screw 14 and the supply screw 16 generate transporting force to transport developer in the developer accommodating unit 10.

However, since slanting directions of screw blades for the stirring screw 14 and the supply screw 16 are reverse to each other, transporting direction of developer is opposite at the top stage and the bottom stage. That is, the stirring screw 14 at the top stage transports developer leftward and the supply screw 16 at the bottom stage transports rightward in FIG. 1. Developer which the stirring screw 14 has transported to the left end in FIG. 1 falls and moves to the supply screw 16 located at the bottom stage. On the other hand, developer which the supply screw 16 has transported to the right end overflows upward and moves to the stirring screw 14. Thereby, developer circulates counterclockwise within the developer accommodating unit 10.

As the developer circulates, some developer present within the supply screw 16 at the bottom stage is supplied to the development roller 18. Thereby, the development roller 18 can apply toner to an electrostatic latent image on the photosensitive drum 90 for development.

On the circulation of the developer, since the stirring screw 14 rotates faster than the supply screw 16, developer-transporting capability of the stirring screw 14 is bigger than that of the supply screw 16. However, since about a half of the stirring screw 14 is buried with developer, between the stirring screw 14 and the supply screw 16, balance of developer to be transported by these screws is actually kept.

As described above, in the developing device 1 according to the present embodiment, the stirring screw 14 and the supply screw 16 which are arranged up and down, respectively, make developer circulate and supply the developer to the development roller 18. Since the stirring screw 14 is designed to rotate faster than the supply screw 16 to show bigger developer-transporting capability, balance of developer to be transported between the top stage and the bottom state is kept in a state that the stirring screw 14 is partially buried with developer. As a result, the developing device requires less amount of developer as a whole, whereby torque for driving screws is made small and a life of developer is made long.

Figure 20:
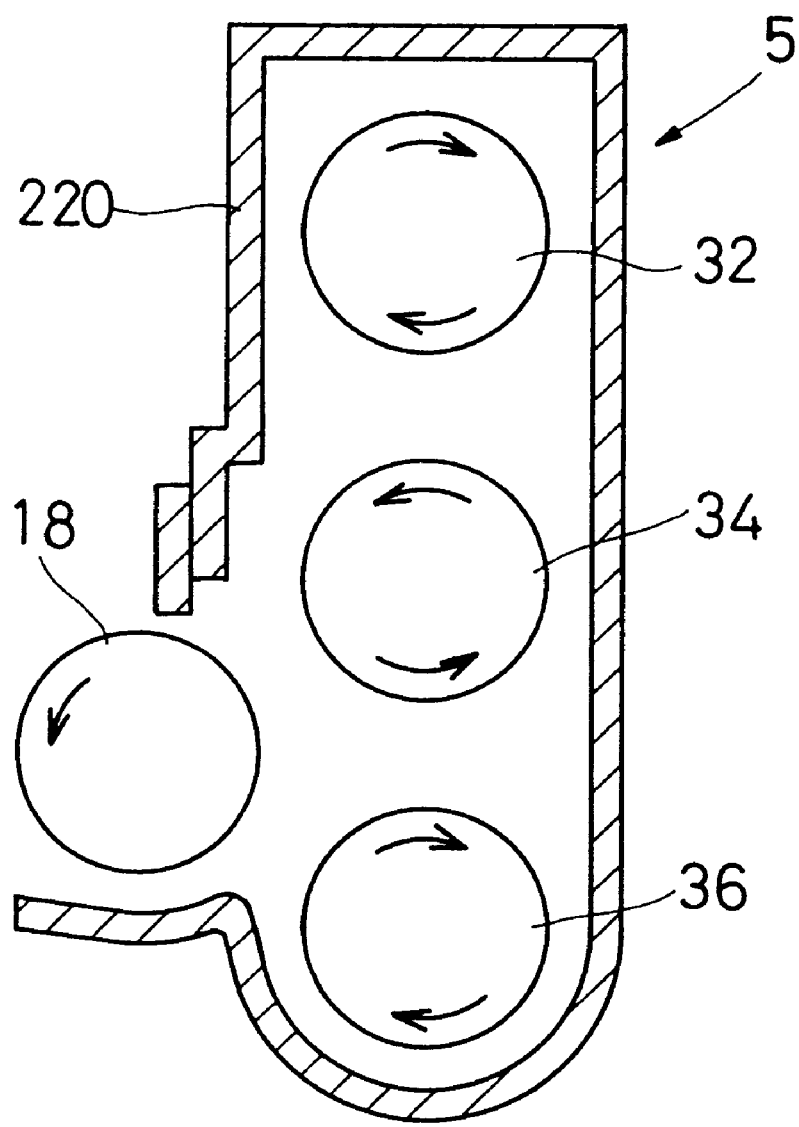
FIG. 20 is a cross sectional side view of a developing device according to FIG. 19.

In the developing device 1, slanting directions of both the stirring screw 14 and the supply screw 16 may be made same and the group of gears may be modified to make rotating direction opposite at top and bottom, instead. The present invention is applicable to a tri-axial circulation type developing device as shown in FIG. 20. In the case of a tri-axial circulation type, rotating speed of a collection screw 36 located at bottom stage may be made slower than those of other screws 32 and 34.

[The Second Embodiment]

Figure 3:
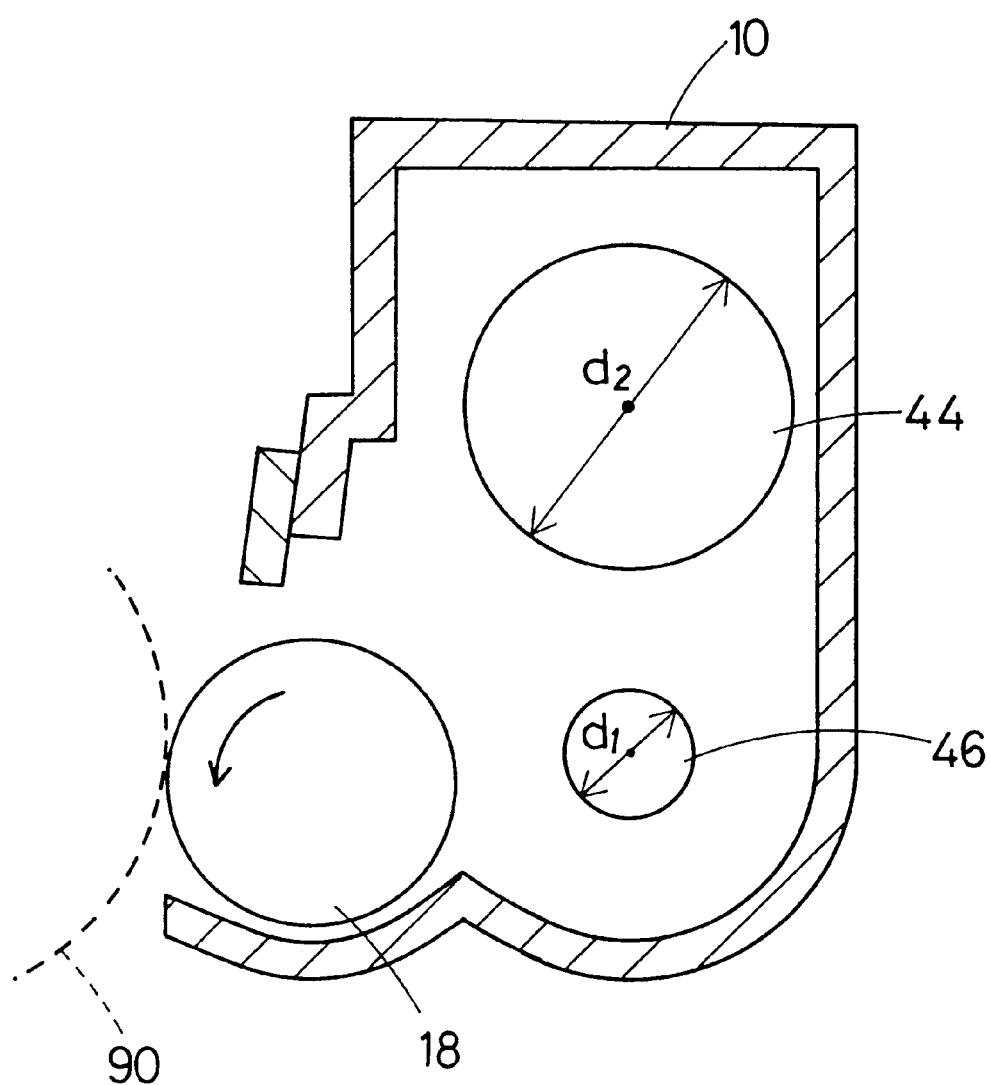
FIG. 3 is a cross sectional side view of a developing device according to the second embodiment.

The second embodiment will be explained. In a developing device according to the second embodiment, diameter of screws are made different between up and down so that developer-transporting capability of a stirring screw 44 is made lager than that of a supply screw 46, instead of making rotating speed of these screws 44 and 46 different. That is, as shown in FIG. 3, in the inventive developing device according to this embodiment, screw diameter $d_2$ for the stirring screw 44 is made larger than screw diameter $d_1$ for the supply screw 46.

On the other hand, a group of gears of the developing device is designed to make rotating speed of the stirring screw 44 and the supply screw 46 equal. Other than this point, structure of the developing device of the second embodiment is same as that of the developing device of the first embodiment.

In the developing device of this embodiment, when a motor is rotated, the supply screw 46 and the stirring screw 44 rotate. The rotations of the stirring screw 44 and the supply screw 46 make developer present within a developer accommodating unit 10 circulate and the developer is supplied to a development roller 18, which is a same manner as the first embodiment.

On the circulation of the developer, since screw diameter of the stirring screw 44 is larger than that of the supply screw 46, developer-transporting capability of the stirring screw 44 is bigger than that of the supply screw 46. However, since about a half of the stirring screw 44 is buried with developer, between the stirring screw 44 and the supply screw 46, balance of developer to be transported by these screws is actually kept.

Thus, in the developing device according to the second embodiment, the stirring screw 44 and the supply screw 16 are arranged up and down, respectively, and diameter of each screw is made different. Thereby, developer-transporting capability of the stirring screw 44 is made larger than that of the supply screw 46 and balance of developer to be transported between the top stage and the bottom state is kept in a state that the stirring screw 44 is partially buried with developer.

[The Third Embodiment]

The third embodiment will be explained. In a developing device according to the third embodiment, screw pitch for a stirring screw 54 and screw pitch for a supply screw 56 are made different between up and down. Thereby, developer-transporting capability of the stirring screw 54 is made lager than that of a supply screw 56.

Figure 4:
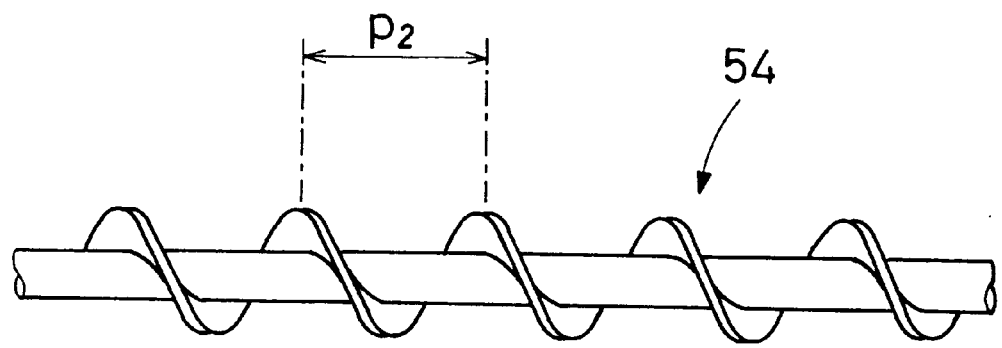
FIG. 4 shows screw blades for a stirring screw of a developing device according to the third embodiment.
Figure 5:
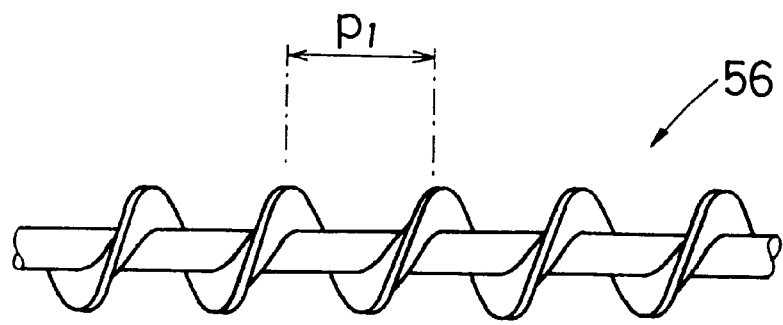
FIG. 5 shows screw blades for a supply screw of a developing device according to the third embodiment.

That is, as shown in FIGS. 4 and 5, in the inventive developing device according to this embodiment, screw pitch $p_2$ for the stirring screw 54 is made larger than screw pitch $p_1$ for the supply screw 56. "The pitch of the screw is large" means that the slanting degree of the screw blade to the shaft is large (the screw blade and the shaft become closer to parallel), whereby the spacing between the screw blades adjacent to each other is made large. On the other hand, "The pitch of the screw is small" means that slanting degree of the screw blade to the shaft is small (the screw blade and the shaft become closer to vertical), whereby the spacing between the screw blades adjacent to each other is made small. When the pitch of the screw is made large, the distance developer being transported in an axial direction during one rotation of the screw is long. In proportion to its length, developer-transporting capability is made larger.

On the other hand, a group of gears of the developing device is designed to make rotating speed of the stirring screw 54 and the supply screw 56 equal. Other than this point, structure of the developing device of the third embodiment is same as that of the developing device of the first embodiment.

In the developing device of this embodiment, when a motor is rotated, the supply screw 56 and the stirring screw 54 rotate. The rotations of the stirring screw 54 and the supply screw 56 make developer present within a developer accommodating unit 10 circulate and the developer is supplied to a development roller 18, which is a same manner as the first embodiment.

On the circulation of the developer, since screw pitch $p_2$ for the stirring screw 54 is larger than screw pitch $p_1$ for the supply screw 56, developer-transporting capability of the stirring screw 54 is bigger than that of the supply screw 56. However, since about a half of the stirring screw 54 is buried with developer, between the stirring screw 54 and the supply screw 56, balance of developer to be transported by these screws is actually kept.

Thus, in the developing device according to the third embodiment, the stirring screw 54 and the supply screw 56 are arranged up and down, respectively, and pitch of each screw is made different. Thereby, developer-transporting capability of the stirring screw 54 is made larger than that of the supply screw 56 and balance of developer to be transported between the top stage and the bottom state is kept in a state that the stirring screw 54 is partially buried with developer.

[The Fourth Embodiment]

Figure 6:
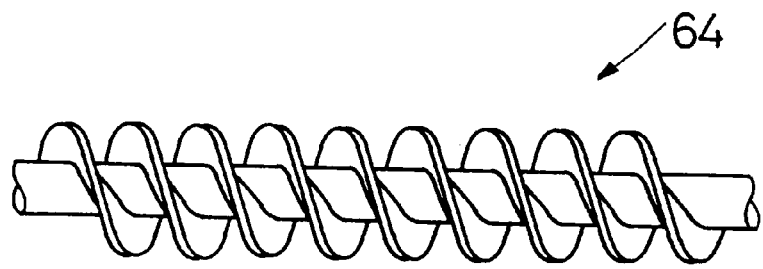
FIG. 6 shows screw blades for a stirring screw of a developing device according to the fourth embodiment.
Figure 7:
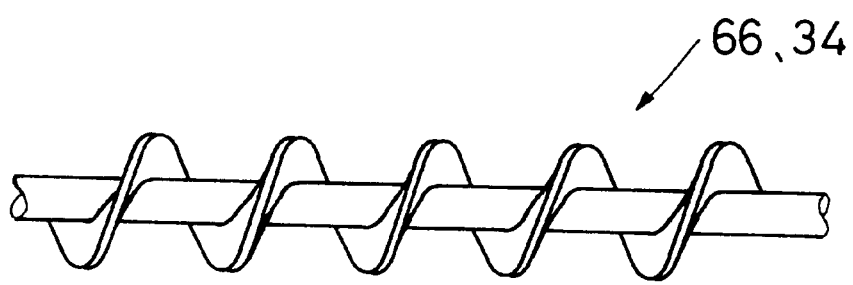
FIG. 7 shows screw blades which are common to a supply screw of a developing device according to the fourth embodiment and a supply screw of a developing device according to the eleventh embodiment.

The fourth embodiment will be explained. In a developing device according to the fourth embodiment, the number of threads for screws are made different between up and down so that developer-transporting capability of a stirring screw 64 is made lager than that of a supply screw 66, instead of making rotating speed of these screws 64 and 66 different. That is, as shown in FIGS. 6, and 7, in the inventive developing device according to this embodiment, the number of threads for the stirring screw 64 is double of the number of threads for the supply screw 66.

When the number of threads for a screw is large, the number of parts to transport developer with its screw blade increases, whereby developer-transporting capability becomes large in response to the number of threads. On the other hand, a group of gears of the developing device is designed to make rotating speed of the stirring screw 64 and the supply screw 66 equal, similar to the cases of the second and third embodiments. Other than this point, structure of the developing device of the fourth embodiment is same as that of the developing devices of the foregoing embodiments.

In the developing device of this embodiment, when a motor is rotated, the supply screw 66 and the stirring screw 64 rotate. The rotations of the stirring screw 64 and the supply screw 66 make developer present within a developer accommodating unit 10 circulate and the developer is supplied to a development roller 18, which is a same manner as the first through third embodiments.

On the circulation of the developer, since the number of threads for the stirring screw 64 is more than that for the supply screw 66, developer-transporting capability of the stirring screw 64 is bigger than that of the supply screw 66. However, since about a half of the stirring screw 64 is buried with developer, between the stirring screw 64 and the supply screw 66, balance of developer to be transported by these screws is actually kept.

Thus, in the developing device according to the fourth embodiment, the stirring screw 64 and the supply screw 66 which are arranged up and down, respectively, and the number of threads for each s crew i s different. Thereby developer-transporting capability of the stirring screw 64 is made larger than that of the supply screw 66 and balance of developer to be transported between the top stage and the bottom stage is kept in a state that the stirring screw 64 is partially buried with developer.

[The Fifth Embodiment]

Figure 8:
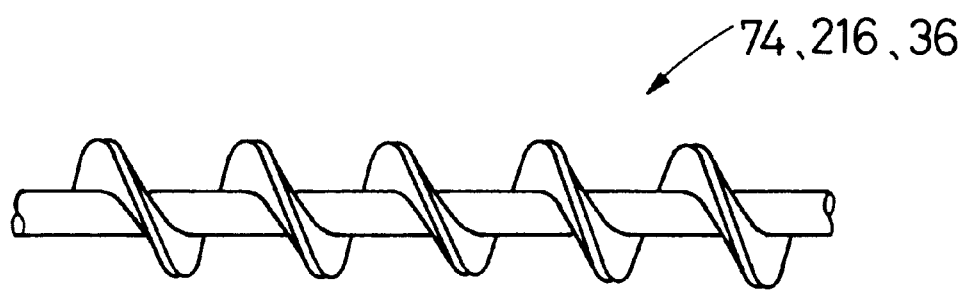
FIG. 8 shows screw blades which are common to a stirring screw of a developing device according to the fifth embodiment and a collecting screw of a developing device according to the tenth embodiment.
Figure 9:
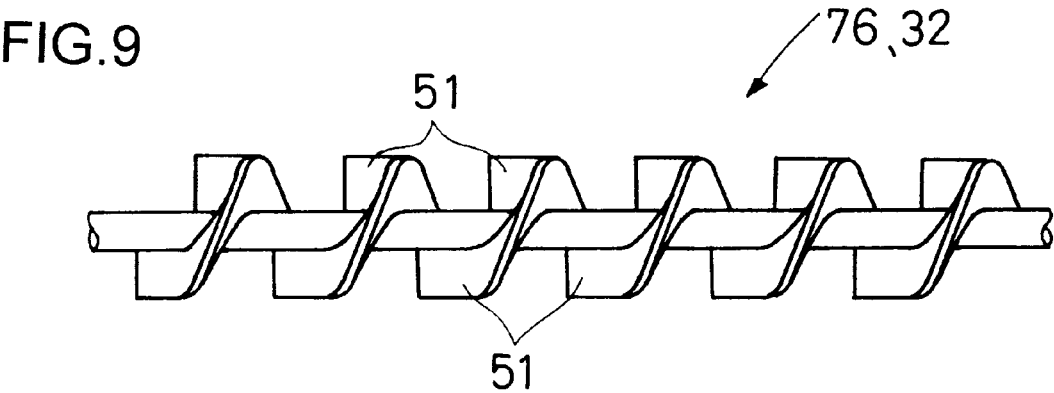
FIG. 9 shows screw blades which are common to a supply screw of a developing device according to the fifth embodiment and a stirring screw of a developing device according to the eleventh embodiment.

The fifth embodiment will be explained. In a developing device according to the fifth embodiment, paddles are arranged on a supply screw 76 so that developer-transporting capability of a stirring screw 74 is made larger than that of the supply screw 76, instead of making rotating speed of these screws 74 and 76 different. That is, as shown in FIG. 9, in the inventive developing device according to this embodiment, the supply screw 76 employs screw blades having paddles 51. The paddle 51 is a member to apply pressure only in a vertical direction to a developer-transporting direction (in a normal direction) without imparting developer-transporting force (pressure in an axial direction) to developer. On the other hand, as shown in FIG. 8, the stirring screw 74 employs screw blades without a paddle.

On the other hand, a group of gears of the developing device is designed to make rotating speed of the stirring screw 74 and the supply screw 76 equal, similar to the cases of the second through the fourth embodiments. Other than this point, structure of the developing device of the fifth embodiment is same as that of the developing devices of the foregoing embodiments.

In the developing device of this embodiment, when a motor is rotated, the supply screw 76 and the stirring screw 74 rotate. The rotations of the stirring screw 74 and the supply screw 76 make developer present within a developer accommodating unit 10 circulate and the developer is supplied to a development roller 18, which is a same manner as the first through fourth embodiments.

On the circulation of the developer, since the supply screw 76 has paddles 51, developer-transporting capability of the stirring screw 74 is bigger than that of the supply screw 76. However, since about a half of the stirring screw 74 is buried with developer, between the stirring screw 74 and the supply screw 76, balance of developer to be transported by these screws is actually kept.

Thus, in the developing device according to the fifth embodiment, the supply screw 76 has paddles 51 so that developer-transporting capability of the stirring screw 74 is made larger than that of the supply screw 76. Thereby, balance of developer to be transported between the top stage and the bottom stage is kept in a state that the stirring screw 74 is partially buried with developer.

Figure 10:
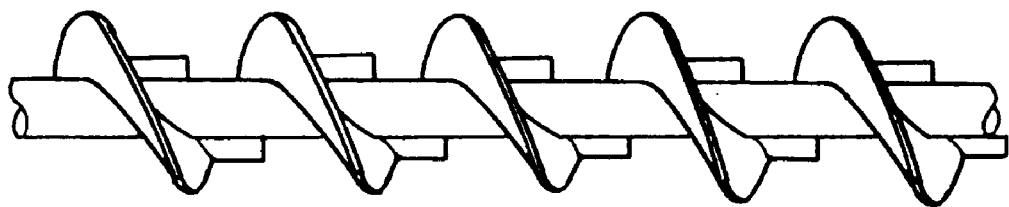
FIG. 10 shows a form of a screw blade which is acceptable as a stirring screw of a developing device according to the fifth embodiment.

In the present embodiment, a screw without a paddle, shown in FIG. 8, is used for the stirring screw 74. However, the stirring screw 74 may employ a screw having a paddle which is smaller than the paddle 51 for the supply screw 76 (see FIG. 10).

[The Sixth Embodiment]

Figure 11:
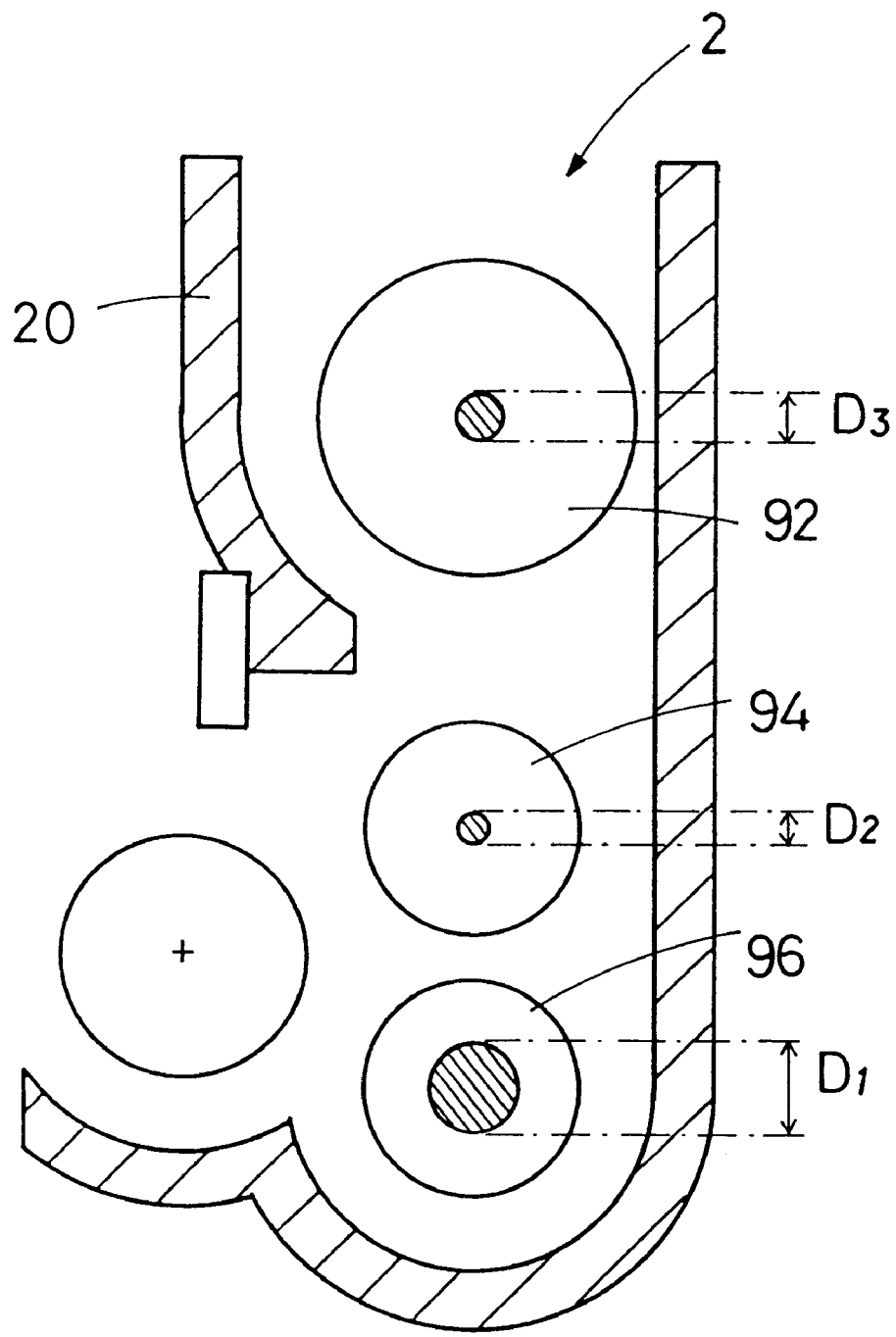
FIG. 11 is a cross sectional side view of a developing device according to the sixth embodiment.

The sixth embodiment will be explained. In a developing device 2 according to the sixth embodiment, as shown in FIG. 11, a stirring screw 92, a supply screw 94, and a collecting screw 96 are arranged in parallel to one another. The supply screw 94 is identical to a stirring screw 14 according to the first embodiment. Further, as to the collecting screw 96, form of its screw blade is almost same as that of a supply screw 14 according to the first embodiment. The only difference is that axial diameter of the collecting screw 96 is larger than that of the supply screw 14. These three screws are arranged at top-middle-bottom. That is, the stirring screw 92, the supply screw 94, and the collecting screw 96 are arranged at top stage, middle stage, and bottom stage, respectively. Similar to the foregoing each embodiment, these screws receive rotating drive from a motor arranged outside of a developer accommodating unit.

Thus, in the developing device 2 according to this embodiment, axial diameter of the collecting screw 96, $D_1$, is made larger than that of the stirring screw 92, $D_3$, and that of the supply screw 94, $D_2$. When axial diameter of a screw is large, area of its screw blade is small and its developer-transporting capability is proportionally small. Therefore, developer-transporting capability of the stirring screw 92 and the supply screw 94 are larger than that of the collecting screw 96. However, the stirring screw 92 is partially buried with developer, balance between amount of developer to be transported by the stirring screw 92 and total amount of developer to be transported by the supply screw 94 and the collecting screw 96, is actually kept.

Thus, in the sixth embodiment, axial diameter of the collecting screw 96, $D_1$, is made large so that the supply screw 94 and the stirring screw 92 can have larger developer-transporting capability than the collecting screw 96. Thereby, distribution balance of developer within the developer accommodating unit is kept in a state that the stirring screw 92 is partially buried with developer. This aspect is, of course, applicable to a bi-axial circulation type developing device. In that case, axial diameter of a supply screw which is to be arranged at lower stage may be made large.

[The Seventh Embodiment]

Figure 12:
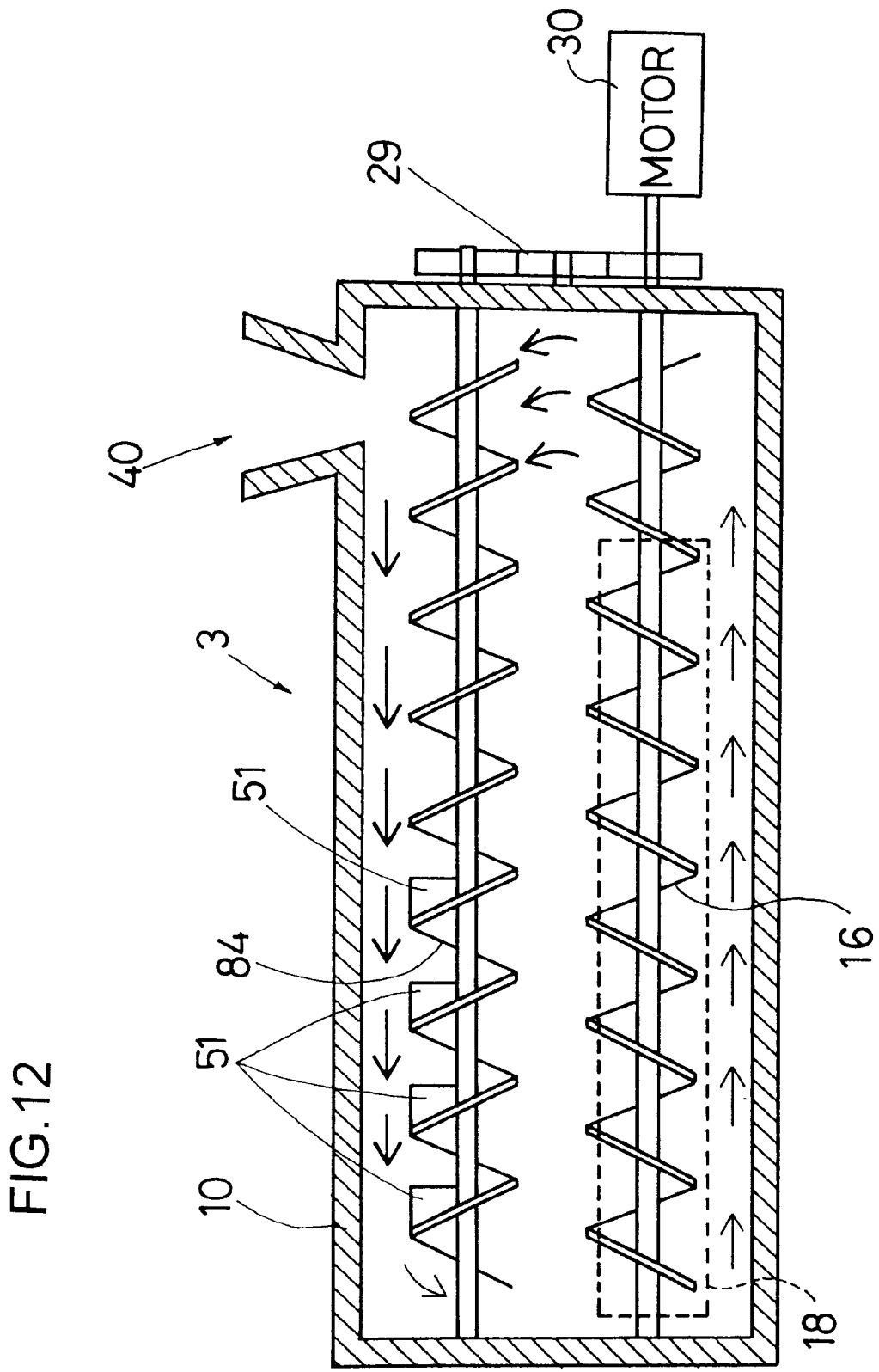
FIG. 12 is a cross sectional front view of a developing device according to the seventh embodiment.
Figure 13:
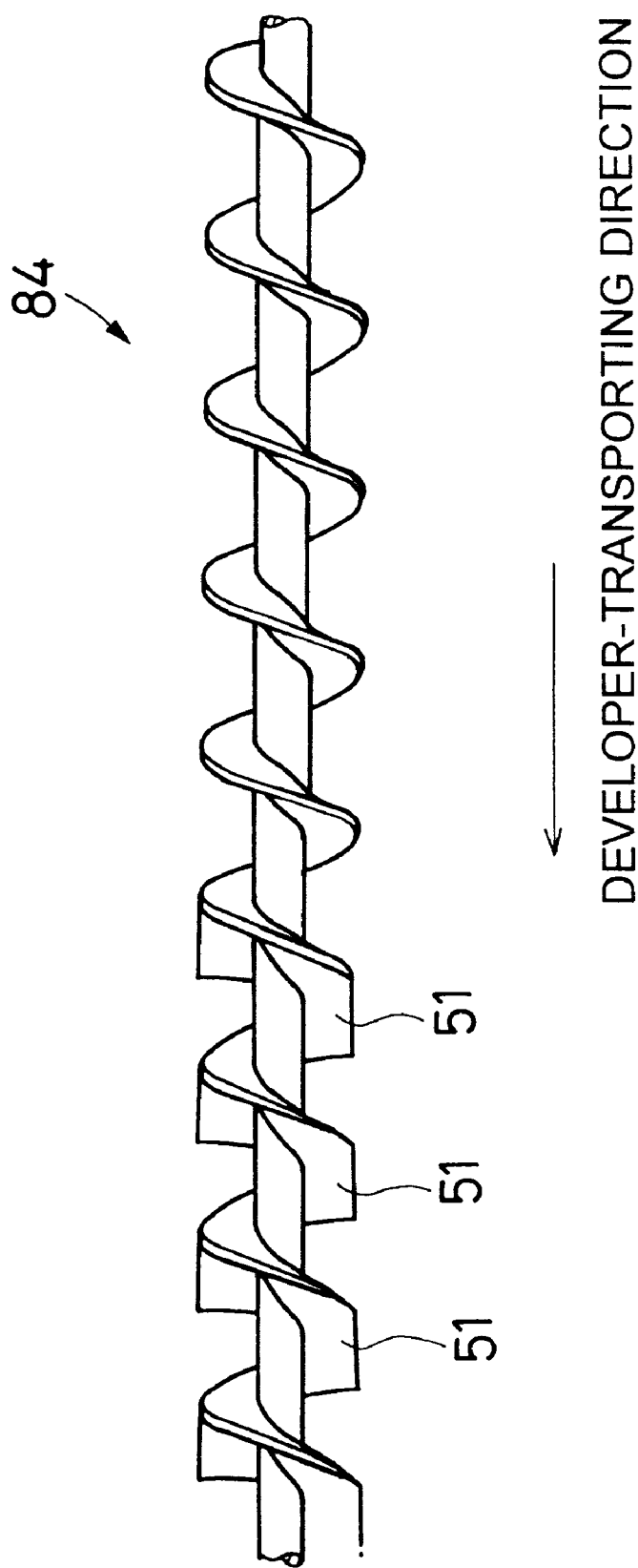
FIG. 13 shows screw blades for a stirring screw of a developing device according to the seventh embodiment.

The seventh embodiment will be explained. A developing device 3 according to the seventh embodiment is a bi-axial circulation type developing device aspect of which is basically common to developing devices according to the first through fifth embodiments. As shown in FIGS. 12 and 13, in the developing device 3, a stirring screw 84 partially employs paddles 51: the paddles 51 are arranged on screw blades of downstream side for developer-transporting direction (left side in the FIGS. 12 and 13). Other than this point, structure of the developing device 3 of the seventh embodiment is almost same as that of the developing device of the first embodiment. Therefore, a supply screw 16 for the developing device 3 does not have any paddles. Moreover, a group of gears 29 for the developing device 3 is arranged to make rotating speed of the stirring screw 84 and the supply screw 16 equal.

In the developing device 3, the stirring screw 84 partially employs the paddles 51 at an area of downstream side for developer-transporting direction. Therefore, at the area, outward pressure generated by the stirring screw 84 is larger than outward pressure by the supply screw 16. Therefore, some developer being transported by the stirring screw 84 gradually moves to the supply screw 16. Subsequently, dispersibility of developer within a developer accommodating unit 10 rises. Thereby, developer density gets more uniform.

When toner is replenished from a toner replenishing port 40, the replenished toner is dispersed and stirred with developer entirely at the area where the paddles 51 are used. Therefore, developer present within the developer accommodating unit 10 promptly turns to be in a state that toner is uniformly dispersed. Such state of developer is supplied to a development roller 18 and development is carried out. However, since paddles are not employed to the stirring screw 84 at an area very close to the toner replenishing port 40, the replenished toner neither moves to the supply roller 16 nor is used for development before charged sufficiently. As a result, occurrence of fog on an image, smoke of toner or the like is prevented.

The strong-and-weak relation between the pressure generated by the stirring screw 84 and the pressure by the supply screw 16 may be adjusted by presence/absence of paddles on the stirring screw 84 as well as effect of gravity. Further, the stirring screw 84 may employ paddles at its upstream area as long as the paddles are smaller than the paddles 51 (see FIG. 10). The attachment of paddles 51 is applicable to, so called, a tri-axial circulation type developing device.

[The Eighth Embodiment]

The eighth embodiment will be explained. In a developing device according to the eighth embodiment, screw pitch of a stirring screw is made different between upstream range and downstream range instead of arranging paddles on a stirring screw. Thereby, outward pressure which generates at the downstream is made to increase.

Figure 14:
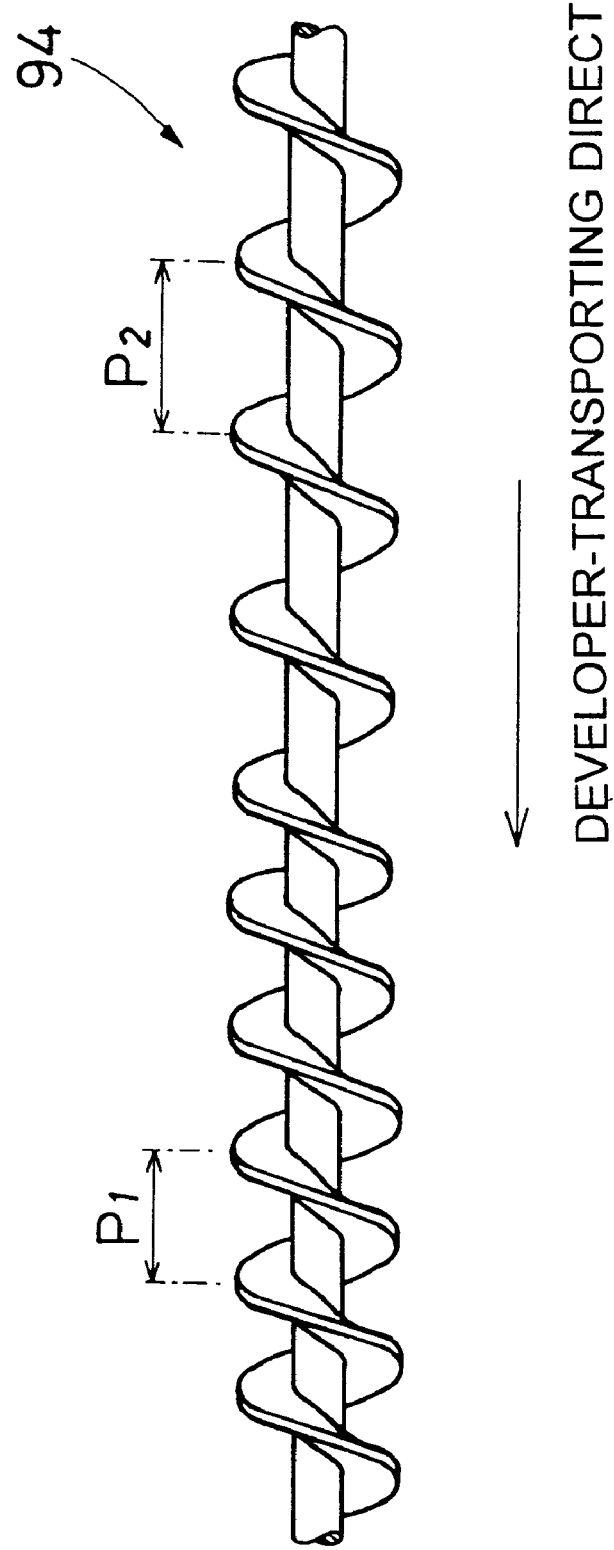
FIG. 14 shows screw blades for a stirring screw of a developing device according to the eighth embodiment.

That is, in the developing device according to this embodiment, for a stirring screw, a screw shown in FIG. 14 is used. In a stirring screw 94 shown in FIG. 14, a pitch $P_1$ of downstream side for developer-transporting direction is made smaller than $P_2$ of upstream side. Other than this point, structure of the developing device of the eighth embodiment is same as that of the developing device of the seventh embodiment. When the screw pitch is small, the distance for developer to be transported in an axial direction during one rotation of the screw is short. This means that pressure generated by rotation of the screw is small in a component of its axial direction and large in a component of normal direction (outward direction). Accordingly, for the stirring screw 94, a component of outward direction for pressure generated by rotation of the screw 94 is larger at the downstream side area than other areas.

Therefore, similar to the seventh embodiment, dispersibility of developer is made to rise. Thereby, occurrence of fog on an image, smoke of toner or the like is prevented.

[The Ninth Embodiment]

The ninth embodiment will be explained. In a developing device according to the ninth embodiment, the number of threads for a stirring screw is made different between upstream side and down stream side instead of arranging paddles on a stirring screw. Thereby, outward pressure which generates at the downstream is made to increase.

Figure 15:
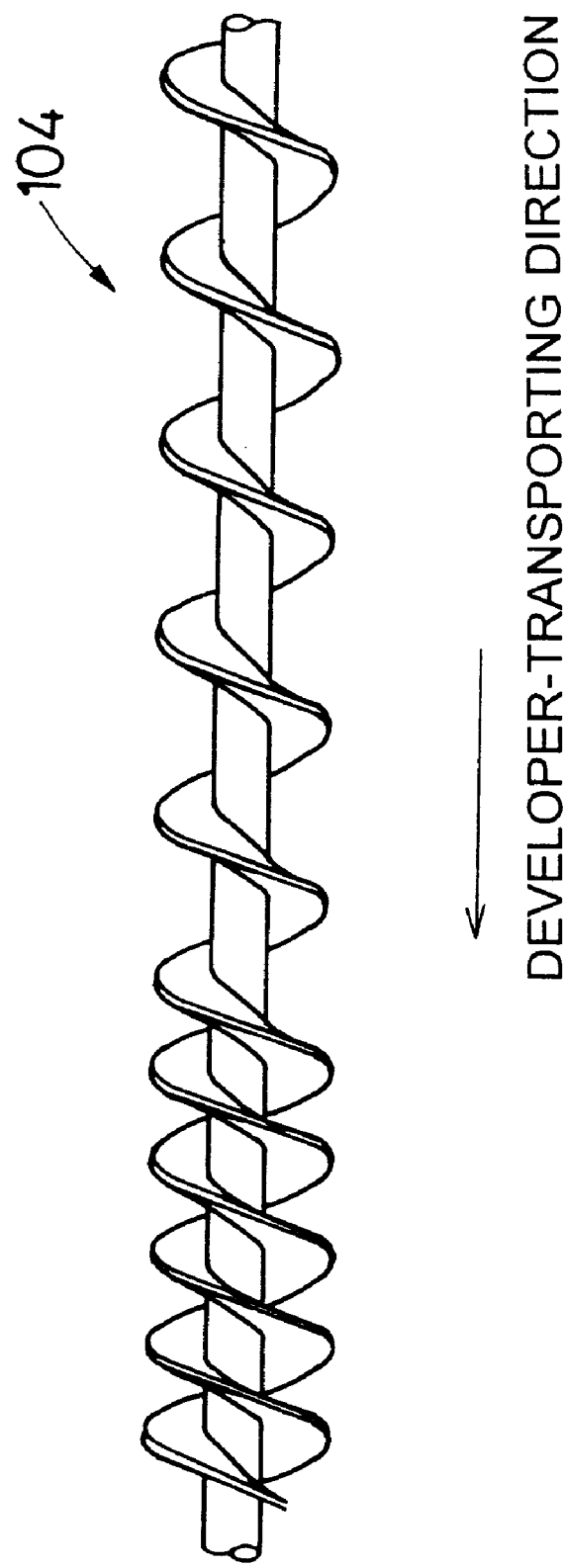
FIG. 15 shows screw blades for a stirring screw of a developing device according to the ninth embodiment.

That is, in the developing device according to this embodiment, for a stirring screw, a screw shown in FIG. 15 is used. In a stirring screw 104 shown in FIG. 15, the number of threads at downstream side for developer-transporting direction is double of the number of threads at upstream side. Other than this point, structure of the developing device of the ninth embodiment is same as that of the developing devices of the seventh and eighth embodiments. When the number of threads for a screw is large, developer receives force from more screws, whereby pressure applied to developer per unit of area is large. Accordingly, for the stirring screw 104, a component of outward direction for pressure generated by rotation of the screw 104 is larger at the downstream side area than other areas.

Therefore, similar to the seventh and eighth embodiments, dispersibility of developer is made to rise. Thereby, occurrence of fog on an image, smoke of toner or the like is prevented.

[The Tenth Embodiment]

Figure 16:
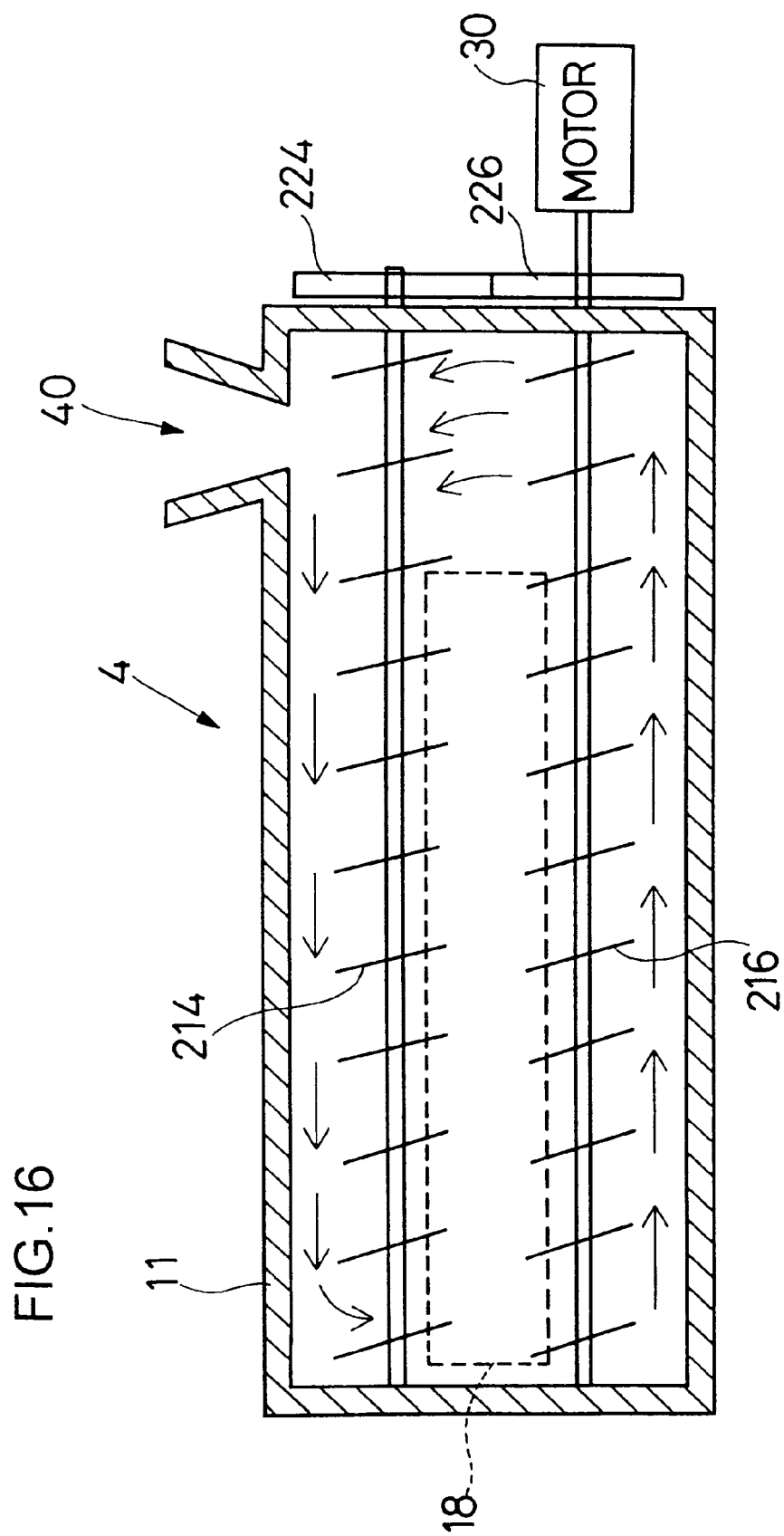
FIG. 16 is a cross sectional front view of a developing device according to the tenth embodiment.
Figure 17:
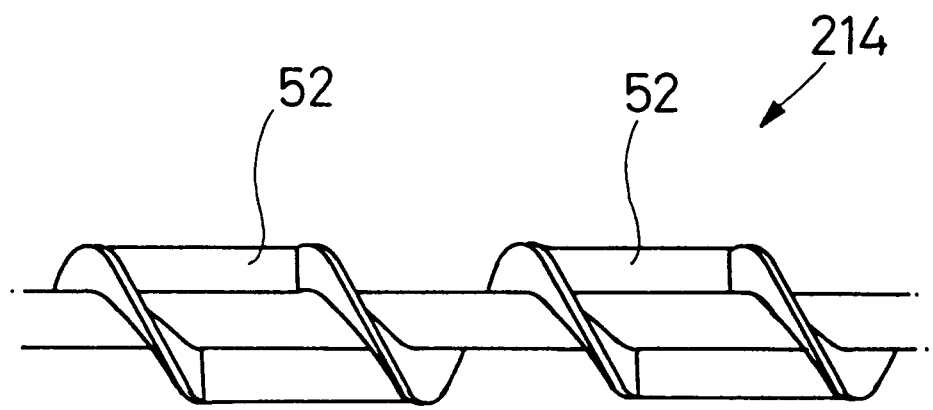
FIG. 17 shows screw blades for a supply screw of a developing device according to the tenth embodiment.

The tenth embodiment will be explained. In a developing device 4 according to the tenth embodiment, as shown in FIG. 16, a supply screw 214 and a collecting screw 216 are arranged in parallel to each other inside a developer accommodating unit 11 for accommodating developer. As shown in FIG. 17, the supply screw 214 includes plurality of screw blades arranged on a rotatable axis slantwise and paddles 52. On the other hand, the collecting screw 216 does not have paddles and is identical to a stirring screw 74 according to the fifth embodiment (FIG. 8).

Gears 224 and 226 connect axis of the stirring screw 214 and that of the supply screw 216 outside the developer accommodating unit 11. Further, a motor 30 is attached to one end of the axis for the supply screw 216. Thereby, the stirring screw 214 and the supply screw 216 are made to rotate in reverse direction to each other with the same speed when the motor 30 is rotated. Further, a toner replenishing port 40 is provided at upstream side for the supply screw 214 (at upper-right in FIG. 16).

Figure 18:
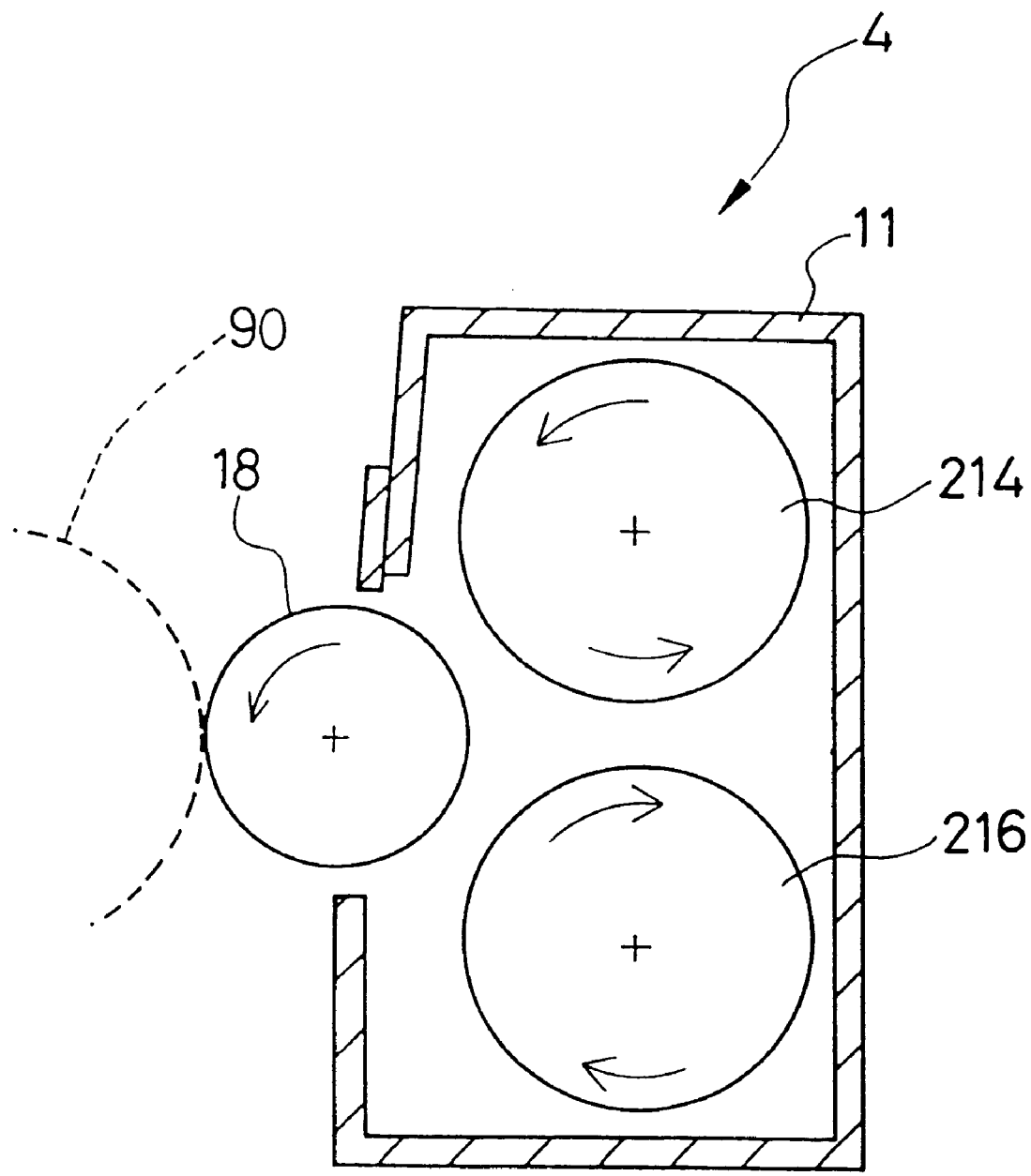
FIG. 18 is a cross sectional side view of a developing device according to FIG. 16.

As shown in FIG. 18, a cross sectional side view of the developing device 4, these two screws are arranged up and down: the supply screw 214 is located at the top stage and the collecting screw 216 is located at bottom stage. Further, a development roller 18 is arranged at height between the supply screw 214 and the collecting screw 216, with a part of it protruding from the developer accommodating unit 11.

In the developing device 4, when the motor 30 is rotated, rotations of the supply screw 214 and the collecting screw 216 make developer present within the developer accommodating unit 11 circulate counterclockwise. Along with the circulation of developer, some developer present in the supply screw 214 at the top stage is supplied to the development roller 18. Thereby, the development roller 18 can apply toner to an electrostatic latent image on the photosensitive drum 90 and thereby, the image gets developed. Further, the collecting screw 216 at the bottom stage collects excessive toner on the development roller 18.

On the circulation of the developer, since the supply screw 214 and the collecting screw 216 rotate in reverse direction to each other, flowing directions of developer which are orthogonal to the axes of the two screws coincide with each other at a part where the two screws face to each other. Thereby, friction of developer can hardly occur. Accordingly, developer is hard to deteriorate. Moreover, even though a partition wall is not arranged between the supply screw 214 and the collecting screw 216, developer transported by each screw does not move to other screw exceeding the amount more than needed. Further, in case that balance of developer between upper part and lower part within a developer accommodating unit is lost and the amount of developer held by the collecting screw 216 increases at the lower part, developer can escape to the supply screw 214 at the upper part due to absence of a partition wall. As a result, balance of developer between the upper parts and the lower part is kept within the developer accommodating unit. Thereby, developer can circulate smoothly. Accordingly, fog on an image and smoke of toner are prevented.

The supply screw 214 according to the present embodiment employs paddles 52, however, a screw without paddles is applicable to the supply screw 214, of course.

[The Eleventh Embodiment]

Figure 19:
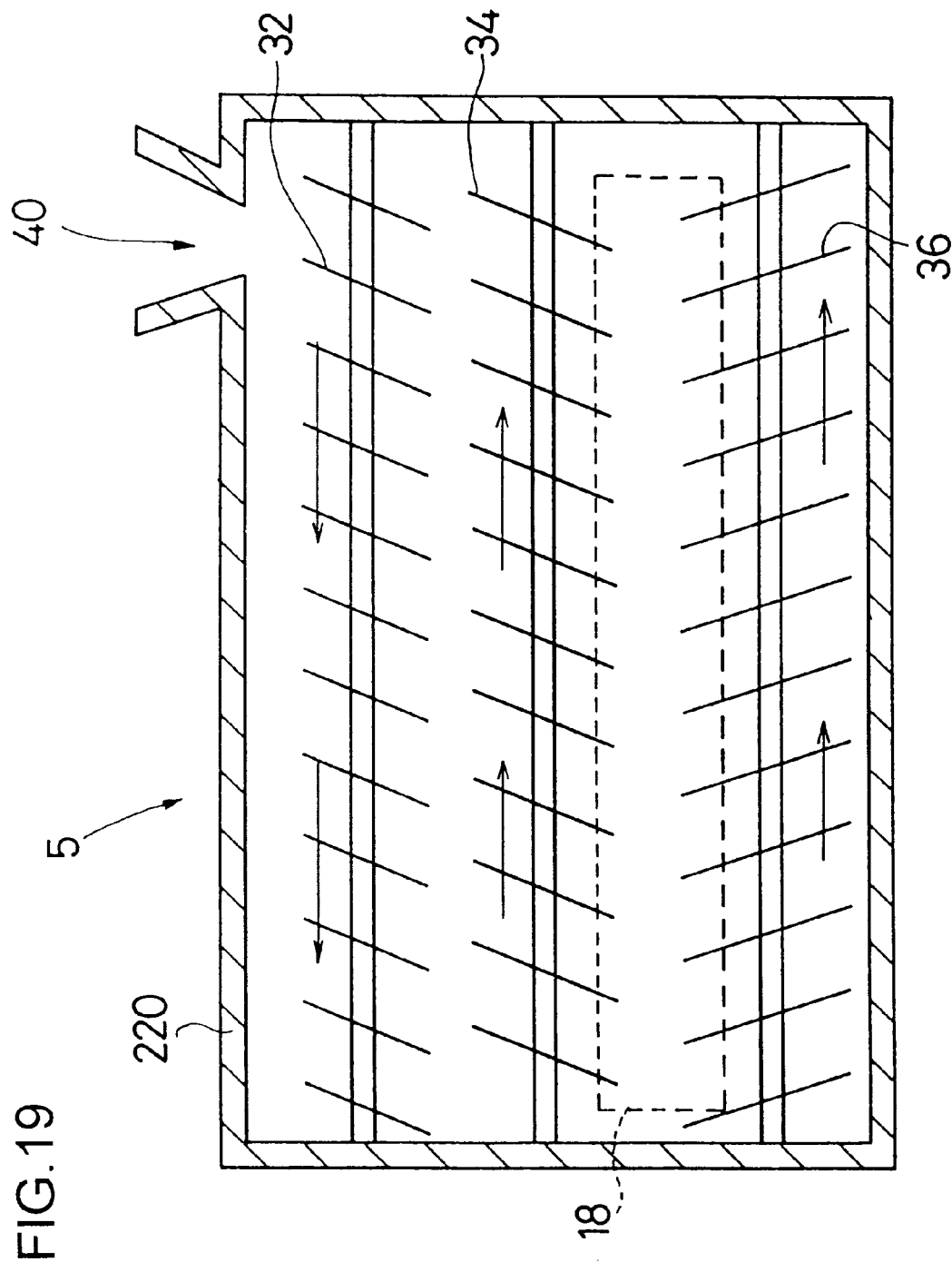
FIG. 19 is a cross sectional front view of a developing device according to the eleventh embodiment.

The eleventh embodiment will be explained. A developing device 5 according to the eleventh embodiment is a tri-axial circulation type developing device. That is, as shown in FIG. 19, a supply screw 34, a collecting screw 36, and a stirring screw 32 are arranged in parallel to one another.

For the supply screw 34, slanting direction of its screw blades is reverse to slanting direction of screw blades for the collecting screw 216 according to the tenth embodiment. Accordingly, the supply screw 34 is identical to the supply screw 66 according to the fourth embodiment (FIG. 7). The collecting screw 36 is identical to the collecting screw 216 according to the tenth embodiment (FIG. 8). The stirring screw 32 is made of a combination of the supply screw 34 and paddles 51. Accordingly, the stirring screw 32 is identical to the supply screw 76 according to the fifth embodiment (FIG. 9). Further, a toner replenishing port 40 is provided at upstream side for the stirring screw 32 (at upper-right in FIG. 19).

As shown in FIG. 20, a cross sectional side view of the developing device 5, these three screws are arranged at top-middle-bottom: the stirring screw 32, the supply screw 34, and the collecting screw 36 are arranged at top stage, middle stage, and bottom stage, respectively. Further, a development roller 18 is arranged at height between the supply screw 34 and the collecting screw 36, with a part of it protruding from a developer accommodating unit 220.

Next, the operation of the developing device 5 will be explained. For circulation of developer, the collecting screw 36 and the stirring screw 32 rotate in same direction and the supply screw 34 rotates in reverse direction. Rotating speeds of the three screws are equal. The rotations of these screws generate transporting force to transport developer in the developer accommodating unit 220. Slanting directions of screw blades for the supply screw 34 and the collecting screw 36 are reverse to each other, however, since rotating directions of these two screws are also reverse, transporting directions of developer by these screws are same. Moreover, slanting directions of screw blades for the stirring screw 32 and the supply screw 34 are same, however, since rotating directions of these two screws are reverse to each other, transporting directions of developer by these screws are reverse to each other.

In FIG. 19, developer is transported leftward by the stirring screw 32 at the top stage, rightward by the supply screw 34 at the middle stage and then rightward by the collecting screw 36 at the bottom stage. Developer which the stirring screw 32 has transported to the left end falls and moves to the supply screw 34 and the collecting screw 36 which are located at lower part. On the other hand, developer which the collecting screw 36 and the supply screw 34 have transported to the right end overflows upward and moves to the stirring screw 32. Thereby, developer circulates counterclockwise within the developer accommodating unit 220.

Along with the circulation of developer, some developer present in the supply screw 34 is supplied to the development roller 18 for development. Further, the collecting screw 36 at the bottom stage collects excessive toner on the development roller 18.

On the circulation of the developer, flowing directions of developer are same at parts where the stirring screw 32 and the supply screw 34, or the supply screw 34 and collecting screw 36 face to each other. Thereby, friction of developer can hardly occur. Accordingly, effects similar to the tenth embodiment can be obtained. The paddles 51 for the stirring screw 32 according to the present embodiment may be eliminated.

[The Twelfth Embodiment]

Figure 21:
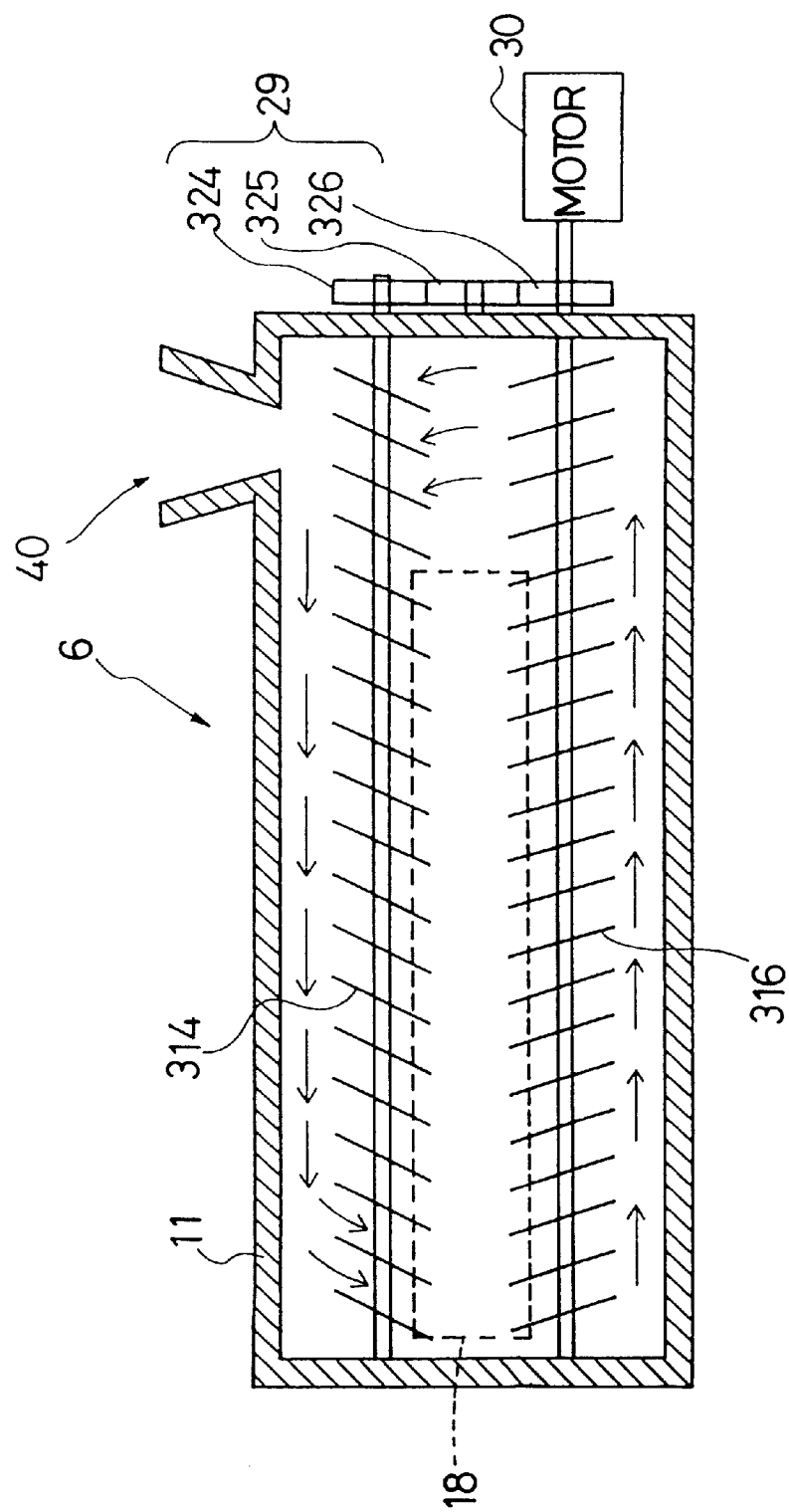
FIG. 21 is a cross sectional front view of a developing device according to the twelfth embodiment.

The twelfth embodiment will be explained. In a developing device 6 according to the twelfth embodiment, as shown in FIG. 21, a supply screw 314 and a collecting screw 316 are arranged in parallel to each other inside a developer accommodating unit 11 for accommodating developer. Slanting direction of screw blades for each screw is reverse to each other. A group of gears 29 connects axis of the supply screw 314 and that of the collecting screw 316 outside the developer accommodating unit 11. In the group of gears 29, the number of teeth of a gear 326 for the collecting screw 316 is same as that of a gear 324 for the supply screw 314. Further, an intermediate gear 325 is disposed between the gear 326 and the gear 324. Thereby, the supply screw 314 and the collecting screw 316 are designed to rotate in same directions with same speeds when the motor 30 is rotated.

Figure 22:
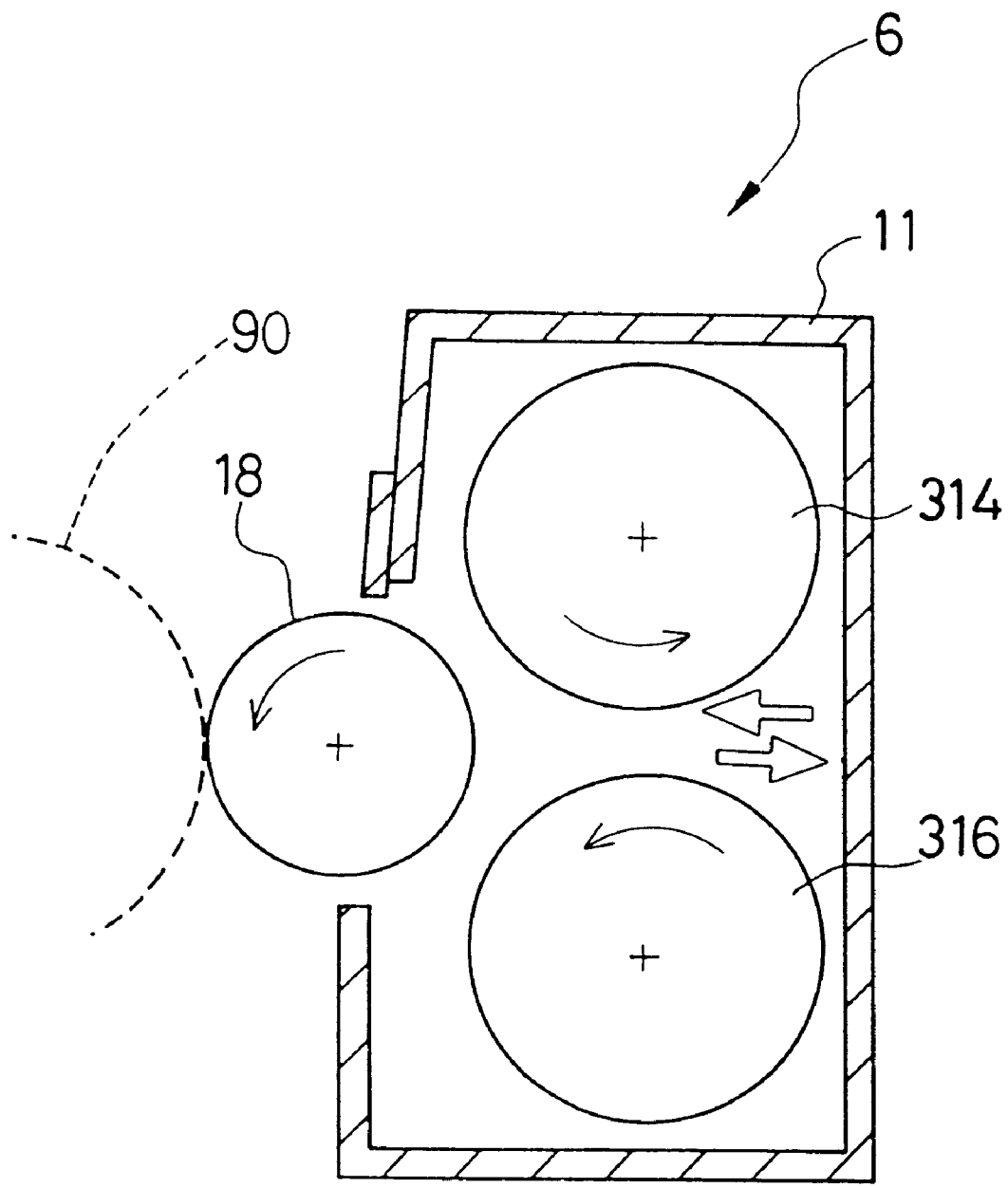
FIG. 22 is a cross sectional side view of a developing device according to FIG. 21.

As shown in FIG. 22, a cross sectional side view of the developing device 6, these two screws are arranged up and down: the supply screw 314 is located at the top stage and the collecting screw 316 is located at bottom stage. The supply screw 314 and the collecting screw 316 are designed to rotate counterclockwise in FIG. 22. Thereby, developer at the top stage and developer at the bottoms stage flow in reverse direction to each other at a part where the supply screw 314 and the collecting screw 316 face to each other. Further, a development roller 18 is arranged at height between the supply screw 314 and the collecting screw 316, with a part of it protruding from the developer accommodating unit 11.

Next, operation of the developing device 6 will be explained. When the motor 30 is rotated, the collecting screw 316 which is coaxial to the motor 30 rotates. The rotation of the motor 30 is transmitted to the supply screw 314 via the group of gears 29. The supply screw 314 and the collecting screw 316 rotate in a same rotating direction with a same rotating speed. The rotations of the supply screw 314 and the collecting screw 316 make developer circulate counterclockwise within the developer accommodating unit 11.

On the circulation of the developer, flowing directions of developer which are orthogonal to the axes of the two screws are reverse at a part where the two screws face to each other. Accordingly, flows of developer transported by the supply screw 314 and by the collecting screw 316 get tangled with each flow, whereby developer is mixed and stirred further. Subsequently, dispersibility of developer within the developer accommodating unit 11 gets better and toner-density of the developer is made more uniform. Thereby, for example, after a black solid image has got developed, developer with low-toner-density collected by the collecting screw 316 is quickly mixed and stirred with developer transported by the supply screw 314. Therefore, toner-density of developer within the developer accommodating unit 11 is constantly kept almost uniform. Such developer is supplied to the development roller 18 for development. As a result, developer toner-density of which has declined can hardly be supplied to the development roller 18 directly. Thereby, deterioration of image due to unevenness of toner-density or the like is prevented.

[The Thirteenth Embodiment]

Figure 23:
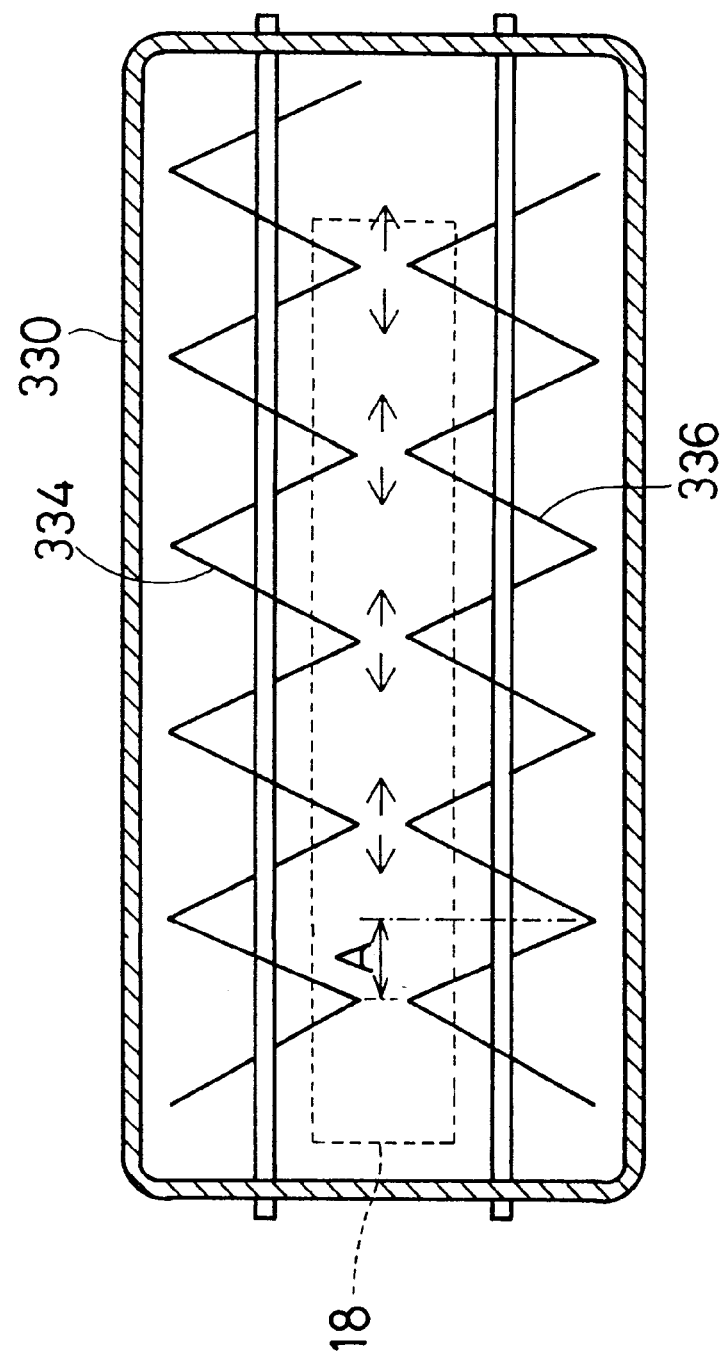
FIG. 23 is a cross sectional front view of a developing device according to the thirteenth embodiment.

The thirteenth embodiment will be explained. In a developing device according to the thirteenth embodiment, a phase of a screw blade for a supply screw and a phase of a screw blade for a collecting screw are set to be different each other so that dispersibility of developer can get better. That is, as shown in FIG. 23, a supply screw 334 and a collecting screw 336 are arranged with their phases of screw blades set to be different for each other by 180 degrees. Other than this point, structure of the developing device of the thirteenth embodiment is same as that of the developing device of the twelfth embodiment. "Phase difference" between the supply screw 334 and the collecting screw 336 herein corresponds to distance A shown in FIG. 23, which can be expressed with a rotating angle of a screw. Moreover, phase difference A is not restricted to 180 degrees, however, 0 degree and 360 degrees are not included in the phase difference defined herein.

In the developing device, since phases of screw blades for the supply screw 334 and the collecting screw 336 are set to be different for each other, distance between the screw blades of these two screws is different part by part. Thereby, distribution of developer being transported by each screw differs point by point at a part where the two screw face to each other. As a result, developer flows from a dense part to a sparse part. For example, referring to FIG. 23, a part where tops of screw blades for each screw face each other (a part where distance between the screw blades for each screw is shortest) is arranged and from this part, developer moves leftward and rightward in FIG. 23. That is, another flow of developer which disturbs flow of developer formed by rotation of each screw is generated.

Thereby, dispersibility of developer transported by each screw gets better and toner-density of the developer within the developer accommodating unit 11 is made more uniform. Therefore, even after a black solid image has got developed, developer with low-toner-density collected by the collecting screw 336 is quickly mixed and stirred with developer transported by the supply screw 334. Therefore, toner-density of developer within the developer accommodating unit 11 is constantly kept almost uniform. As a result, developer toner-density of which has declined can hardly be supplied to the development roller 18 directly. Thereby, deterioration of image due to unevenness of toner-density or the like is prevented.

[The Fourteenth Embodiment]

Figure 24:
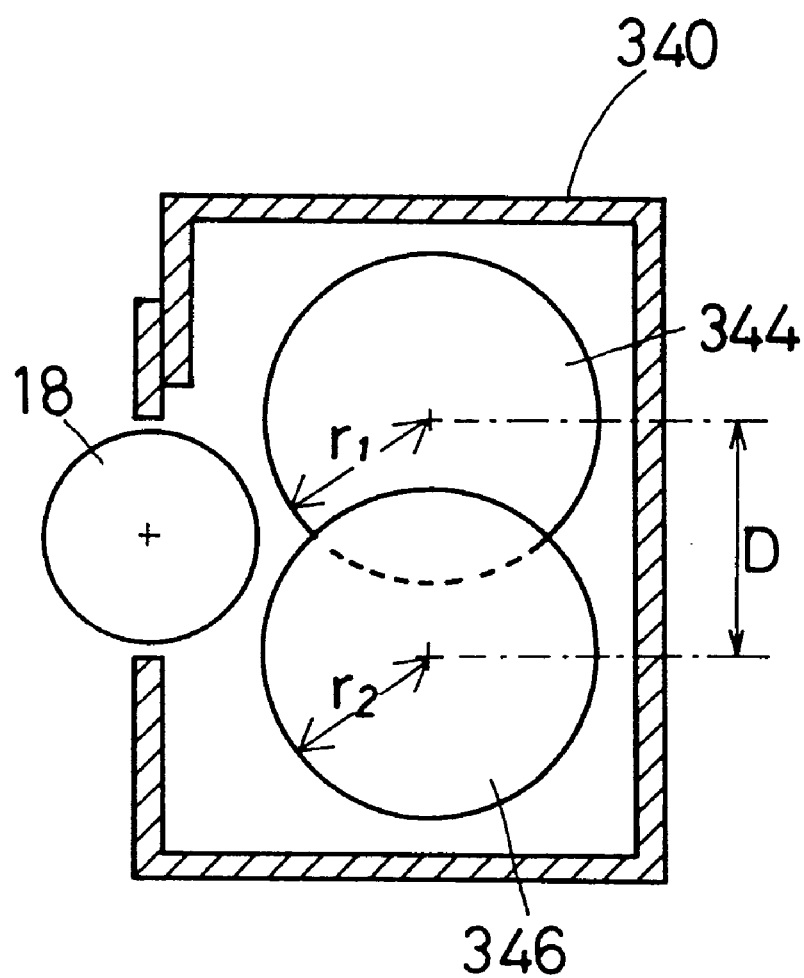
FIG. 24 is a cross sectional side view of a developing device according to the fourteenth embodiment.

The fourteenth embodiment will be explained. In a developing device according to the fourteenth embodiment, distance between axes of screws is shorten so that dispersibility of developer can get better. That is, as shown in FIG. 24, a summation of radius $r_1$ of a screw blade for a supply screw 344 and radius $r_2$ of a screw blade for a collecting screw 346, $(r_1+r_2)$, is larger than distance D which is between axes of the screws. Other than this point, structure of the developing device of the fourteenth embodiment is same as that of the developing device of the twelfth embodiment.

Figure 25:
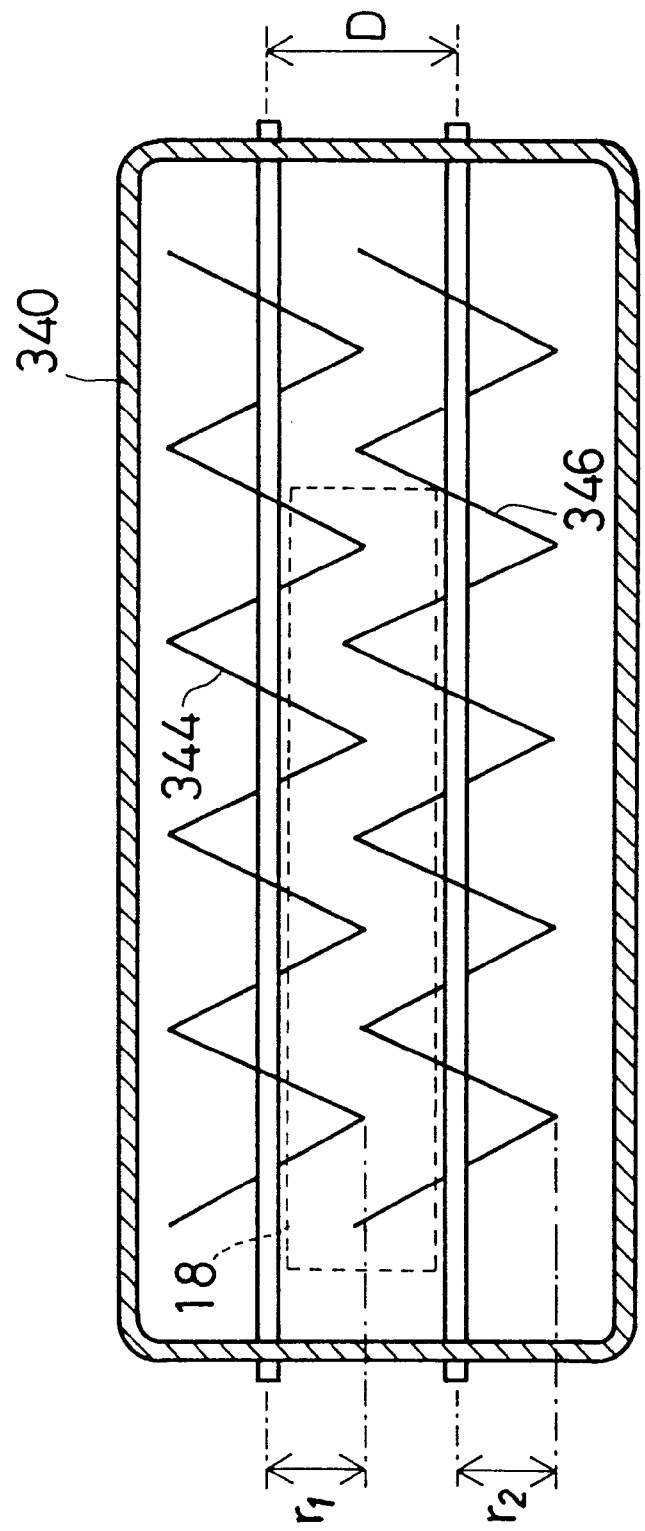
FIG. 25 is a cross sectional front view of a developing device according to FIG. 24.

In the developing device according to this embodiment, since the distance D which is between axes of the two screws is short, tops of screw blades for the two screws come into valley-like spaces between mountains for other screw blades (see FIG. 25). Thereby, developers being transported by each screw get entangled, whereby the developers further mix. Thereby, toner-density of the developer within the developer accommodating unit 340 is made more uniform. Therefore, even after a black solid image has got developed, developer with low-toner-density collected by the collecting screw 346 is quickly mixed and stirred with developer transported by the supply screw 344. Therefore, toner-density of developer within the developer accommodating unit 340 is constantly kept almost uniform. As a result, developer toner-density of which has declined can hardly be supplied to the development roller 18 directly.

[The Fifteenth Embodiment]

Figure 26:
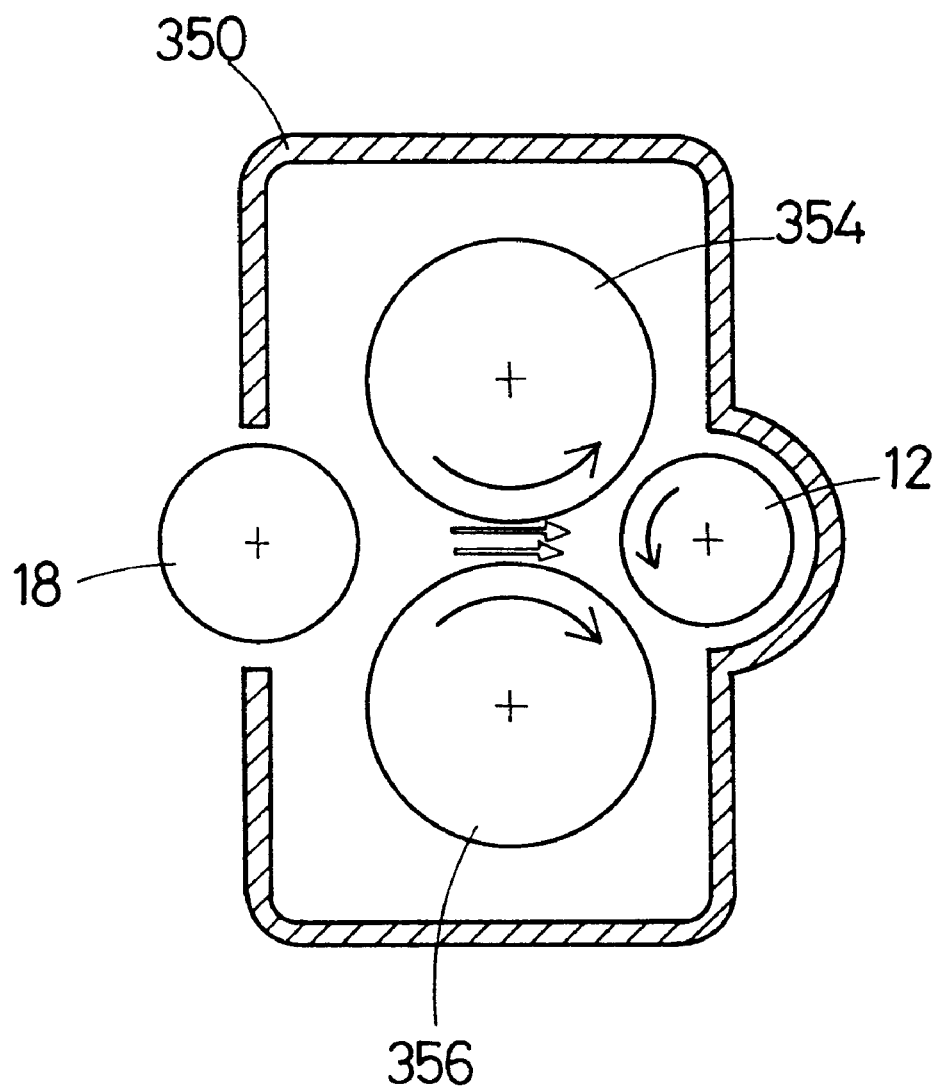
FIG. 26 is a cross sectional side view of a developing device according to the fifteenth embodiment.

The fifteenth embodiment will be explained. In a developing device according to the fifteenth embodiment, a dispersing member is arranged at intermediate height of two screws so that dispersibility of developer can get better. That is, as shown in FIG. 26, a dispersing screw 12 is arranged at intermediate height of a supply screw 354 and a collecting screw 356. The dispersing screw 12 is to disperse developer while transporting developer in a direction reverse to developer-transporting direction of the collecting screw 356. Other than this point, structure of the developing device of the fifteenth embodiment is same as that of the developing device of the twelfth embodiment. Further, the dispersing screw 12 can be arranged in a manner that developer-transporting direction of the dispersing screw 12 is same as a that of the collecting screw 356.

Rotating direction of the supply screw 354 is reverse to that of the collecting screw 356. That is, as indicated with white arrows in FIG. 26, flowing directions of developer which are orthogonal to the axes of the two screws coincide with each other at a part where the two screws face to each other. However, rotating directions of the two screws may be made same, similar to the aspect shown in FIG. 22. When the rotating directions are made same, the flowing directions of developer which are orthogonal to the axes of the two screws are reverse to each other.

In the developing device according to this embodiment, since the dispersing screw 12 disperses developer between the supply screw 354 and the collecting screw 356, toner-density of the developer within a developer accommodating unit 350 is made more uniform. Therefore, even after a black solid image has got developed, developer with low-toner-density collected by the collecting screw 356 and developer transported by the supply screw 354 are quickly mixed and stirred together by the dispersing screw 12. As a result, developer toner-density of which has declined can hardly be supplied to the development roller 18 directly.

Figure 27:
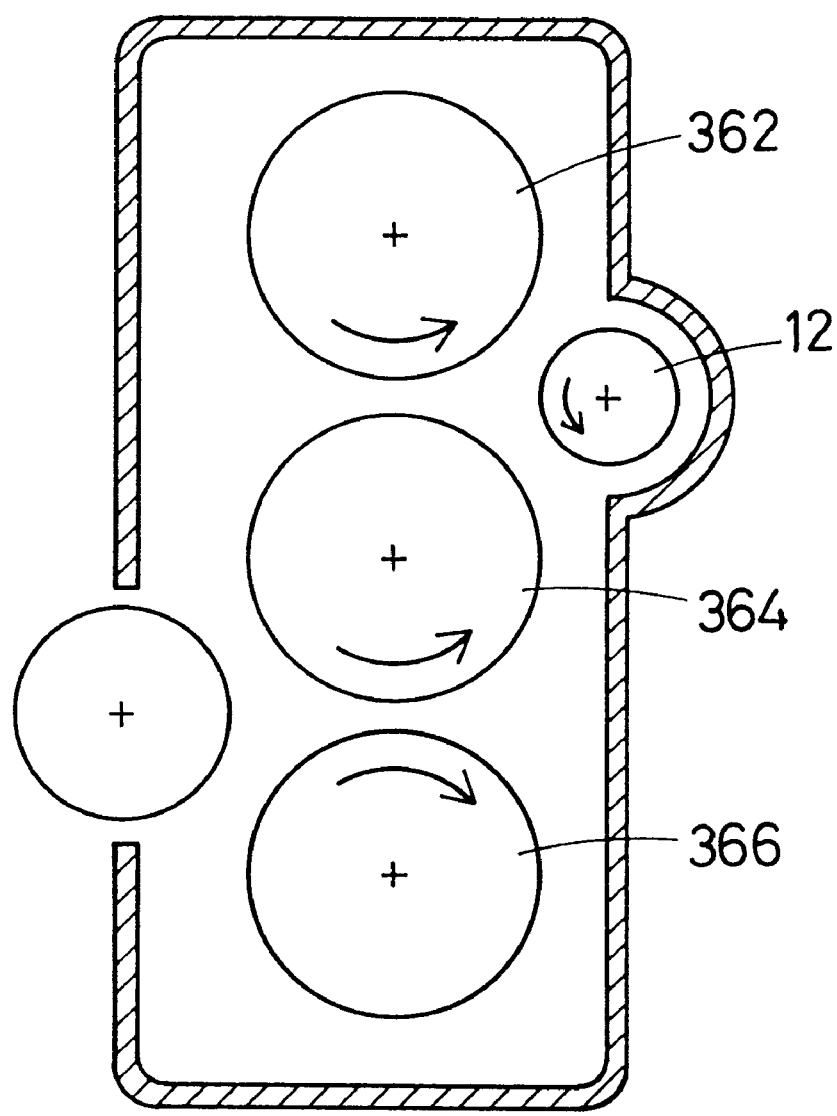
FIG. 27 is a variant of a developing device according to the fifteenth embodiment.

The manner described in the present embodiment is applicable to a tri-axial circulation type developing device. For example, as shown in FIG. 27, a dispersing screw 12 may be arranged at an intermediate position of a stirring screw 362 and a supply screw 364. Additionally, it is much better to arrange another dispersing screw at an intermediate position of the supply screw 364 and a collecting screw 366.

[The Sixteenth Embodiment]

Figure 28:
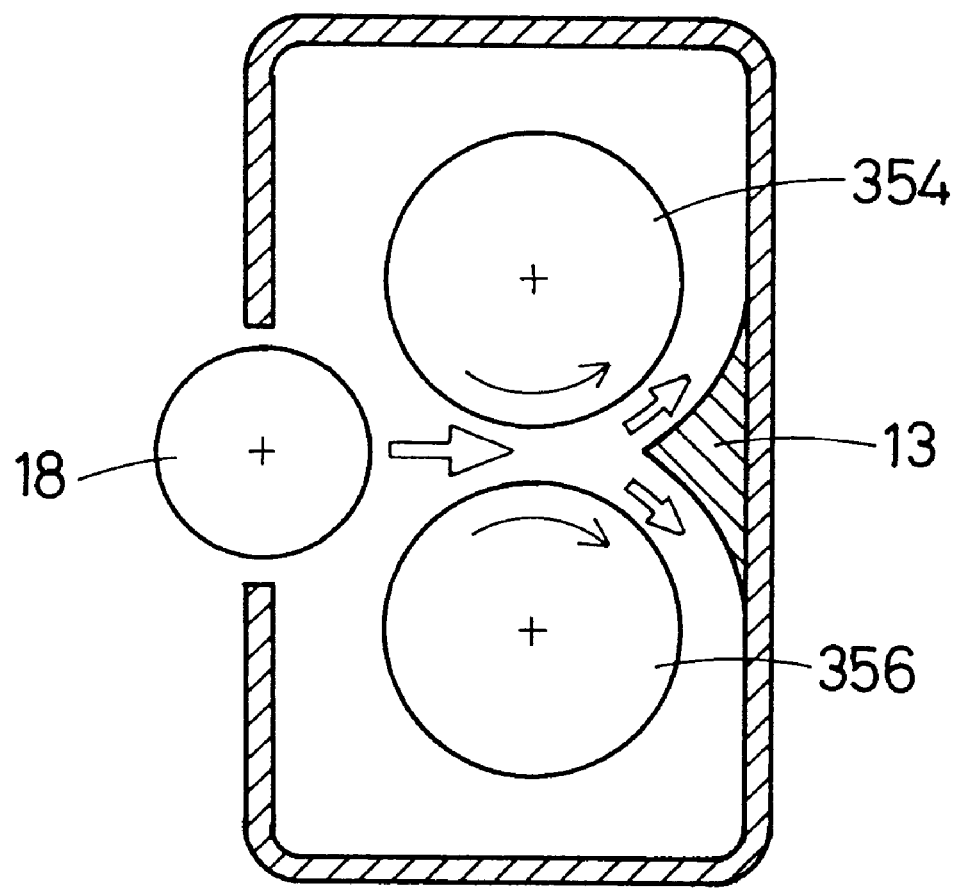
FIG. 28 is a cross sectional side view of a developing device according to the sixteenth embodiment.

The sixteenth embodiment will be explained. In a developing device according to the sixteenth embodiment, a guide member is employed as a dispersing member instead of a dispersing screw described in the fifteenth embodiment. That is, as shown in FIG. 28, a guide member 13 is arranged at an intermediate position of a supply screw 354 and a collecting screw 356 so that the guide member 13 can regulate flow of developer which flows in a direction orthogonal to axes of the screws at a part where the screws face to each other. Other than this point, structure of the developing device of the sixteenth embodiment is same as that of the developing device of the fifteenth embodiment.

As shown in FIG. 28, the cross section of the guide member 13 is a smoothly curved mountain-like shape and has a peak at height point which is the center of distance between axes of the supply screw 354 and the collecting screw 356. The guide member 13 has such a peak so that the guide member 13 can smoothly regulate and lead flows of developer transported by the supply screw 354 and the collecting screw 356 upward and downward, respectively, whereby dispersibility of developer is made better. Incidentally, flow of developer which flows in a direction orthogonal to axes of the screws at a part where the screws face to each other must coincide with each other so that the guide member 13 can surely regulate flow of the developer.

In the developing device according to this embodiment, the guide member 13 is to have developer further disperse. Therefore, toner-density of developer is constantly kept almost uniform. Thereby, deterioration of image due to unevenness of toner-density or the like is prevented.

[The Seventeenth Embodiment]

Figure 29:
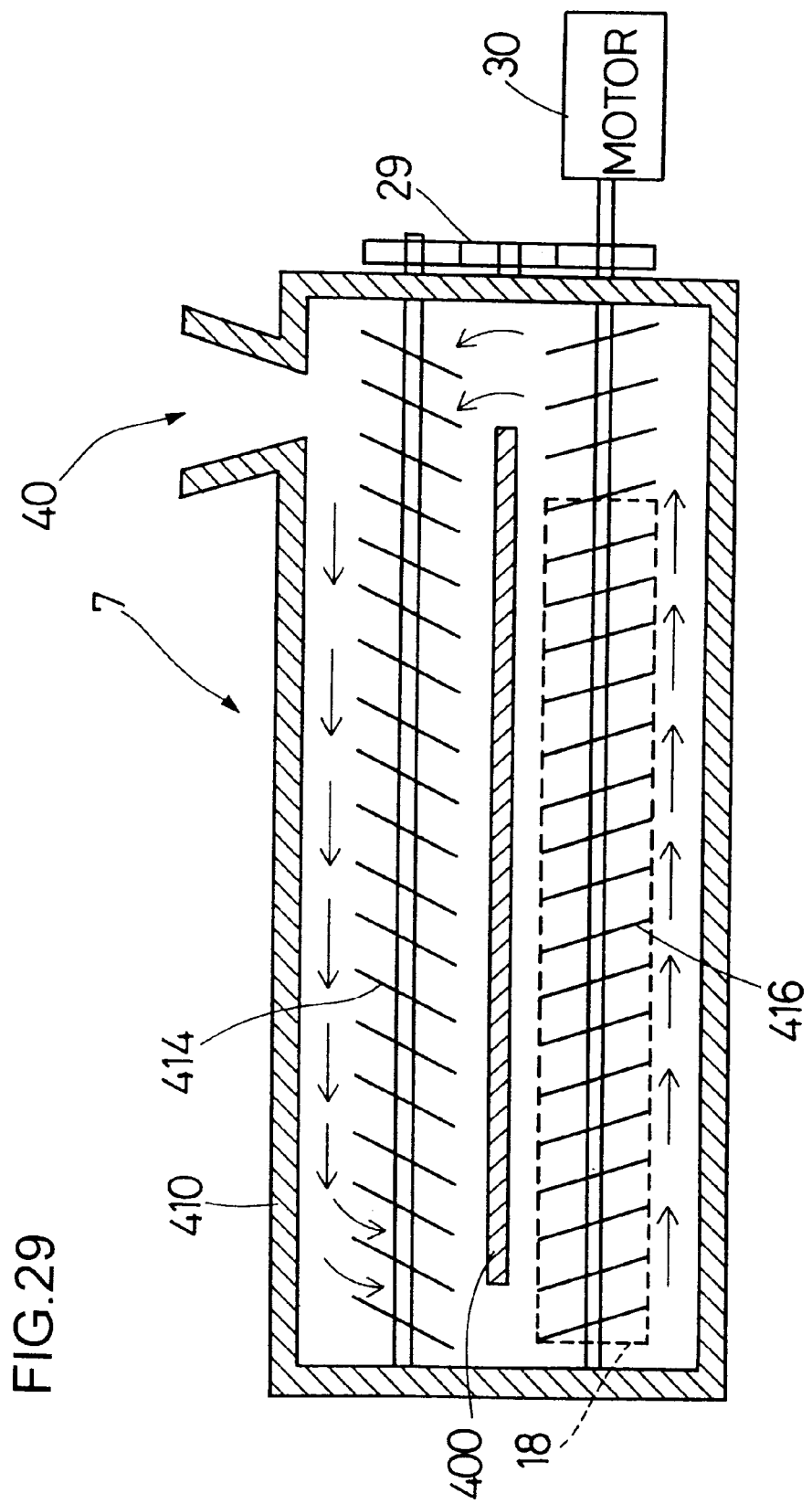
FIG. 29 is a cross sectional front view of a developing device according to the seventeenth embodiment.
Figure 30:
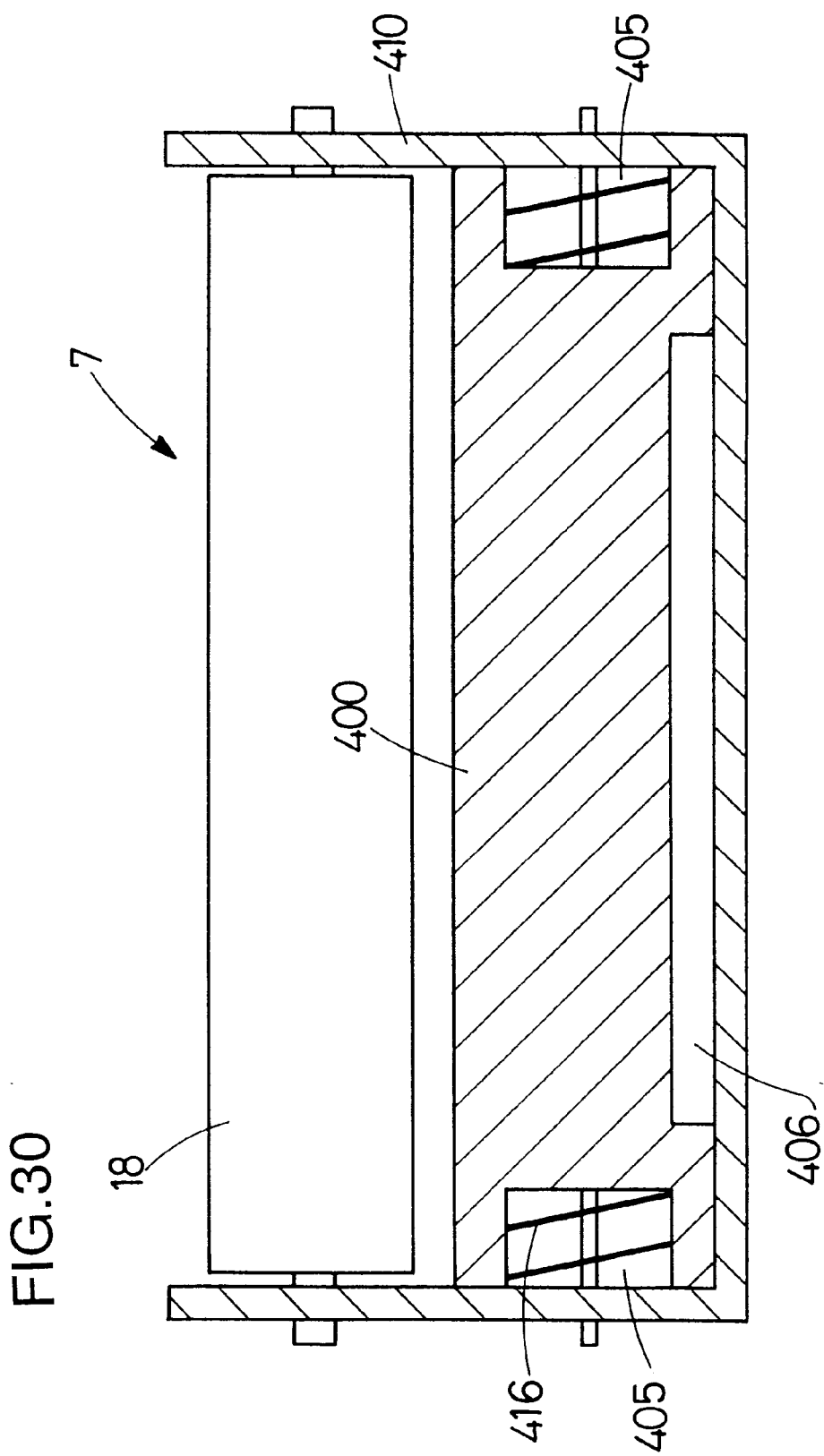
FIG. 30 is a cross sectional plane view of a developing device according to FIG. 29.

The seventeenth embodiment will be explained. In a developing device 7 according to the seventeenth embodiment, as shown in FIG. 29, a stirring screw 414 and a supply screw 416 are arranged in parallel to each other inside a developer accommodating unit 410. Outside the developer accommodating unit 410, these two screws are connected to a group of gears 29 and a motor 30. A partition wall 400 is arranged between the two screws. As shown in FIG. 30, opening portions 405 are arranged at both ends of the partition wall 400 in longitudinal direction and further, a passing portion 406 is opened at a side opposite to a side where development roller 18 is arranged.

Figure 31:
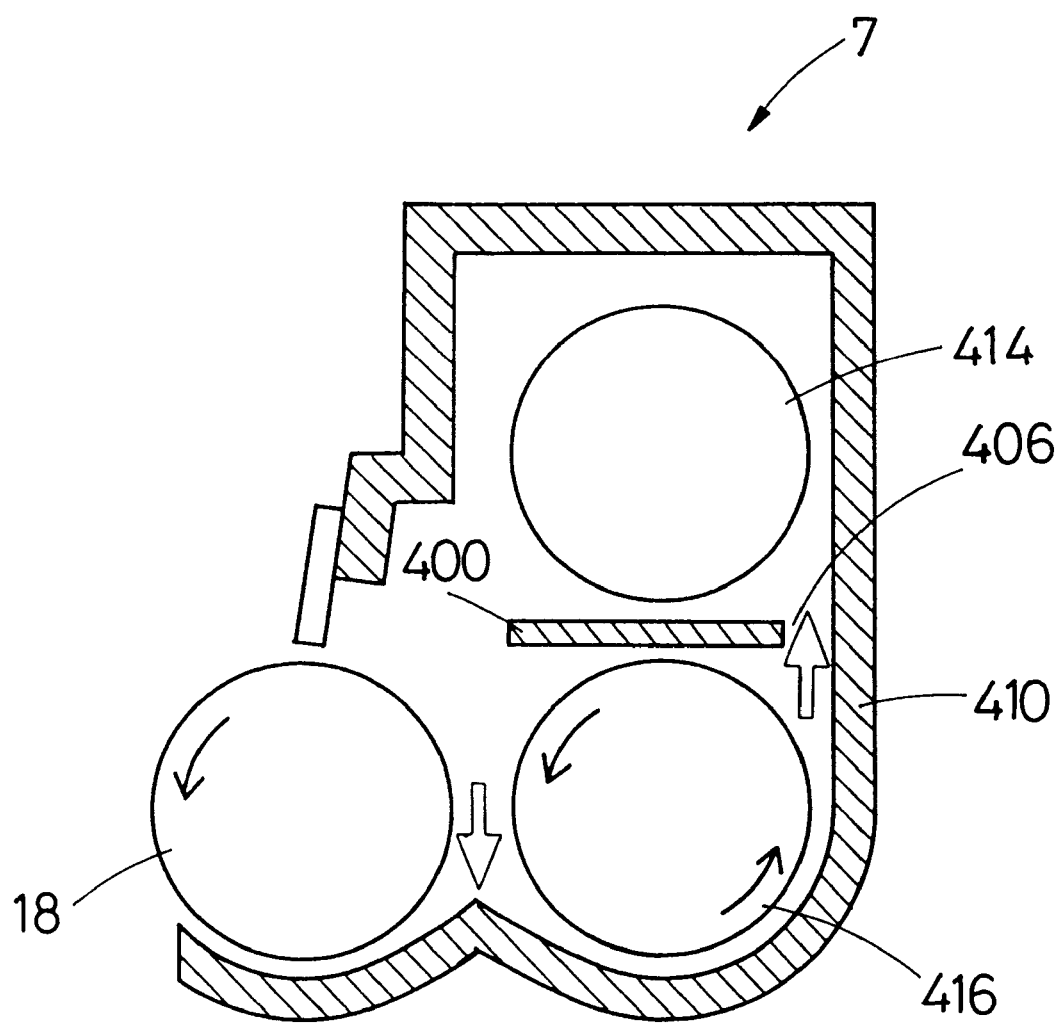
FIG. 31 is a cross sectional side view of a developing device according to FIG. 29.

As shown in FIG. 31, a cross sectional side view of the developing device 7, when the supply screw 416 rotates, upward pressure and downward pressure are generated at right side of the supply screw 416 (opposite side of the development roller 18) and left side of the supply screw 416 (the development roller 18 side), respectively (see white arrows in FIG. 31). Incidentally, a position where the partition wall 400 receives upward pressure generated by rotation of the supply screw 416 coincides with a position where the passing portion 406 opens.

In the developing device 7, movement of developer between the stirring screw 414 and the supply screw 416 occurs at the opening portions 405 arranged at both ends of the partition wall 400 and through the passing portion 406. That is, developer properly moves between the screws when being transported by the stirring screw 414 and the supply screw 416. Since developer moves between the screws in the midst of transportation by the screws, developer is prevented from staying at a same part, whereby balance of developer-transporting capabilities between the stirring screw 414 and the supply screw 416 is kept. Further, since the partition wall 400 is arranged immediately below the stirring screw 414, excessive movement of developer, wherein developer moves from the stirring screw 414 to the supply screw 416 due to gravity, is restrained. Thereby, developer not sufficiently stirred and mixed is never supplied to the development roller 18.

Opening area of the passing portion 406 will be explained herein. When the opening area of the passing portion 406 is too small, developer does not move between the stirring screw 414 and the supply screw 416 satisfactorily. As a result, developer tends to stay at the both ends of the partition wall 400, whereby torque for driving screws increases. On the other hand, when the opening area of passing portion 406 is too large, developer more than required moves from the stirring screw 414 to the supply screw 416. Thereby, developer not sufficiently stirred and mixed is supplied to the development roller 18. To avoid the above-mentioned problems, opening area of the passing portion 406 has to be set to appropriate one.

Figure 32:
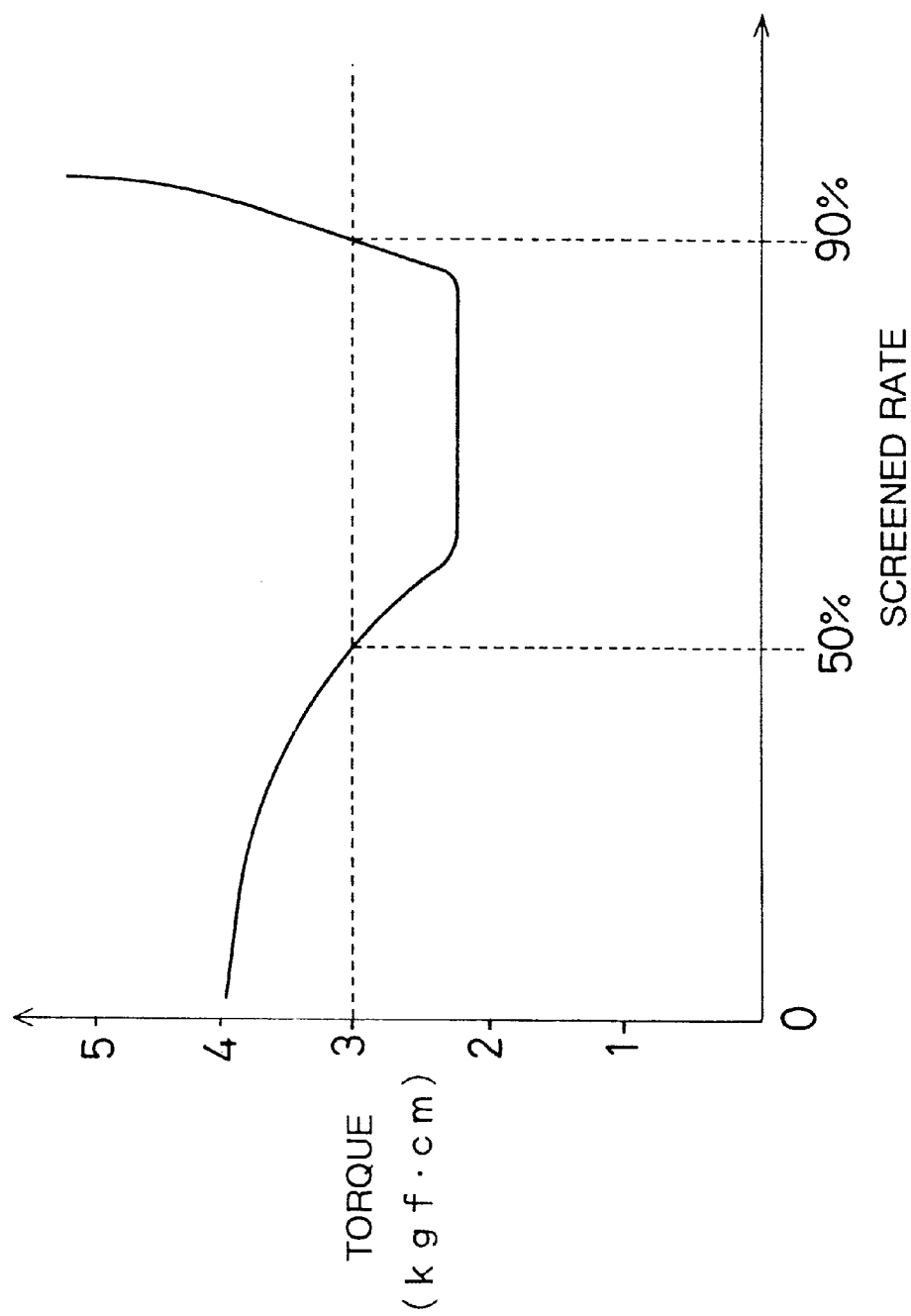
FIG. 32 is a graph showing the relation between torque for driving a screw and screened rate.

The relation between torque for driving screws and screened rate has been examined and its result is shown in FIG. 32. The screened rate means rate of opening area to the entire area of the partition wall 400. For a screened rate, a state that the partition wall 400 does not have an opening portion is defined as 100% and a state that an opening portion occupies entire area, that is, a state no partition wall 400 is defined as 0%.

FIG. 32 indicates that when the screened rate is between 50 and 90%, driving torque is under its tolerable value (3 Kgf·cm). That is, when opening area of the passing portion 406 occupies between 10 and 50% of the entire area of the partition wall 400, screws can be driven with low torque. Accordingly, the passing portions 406, opening area of which satisfies the above specified screened rate, can suppress increase of torque for driving screws, whereby smooth circulation and stir of developer is secured and occurrence of unevenness of toner-density, fog of toner or the like is prevented.

Figure 33:
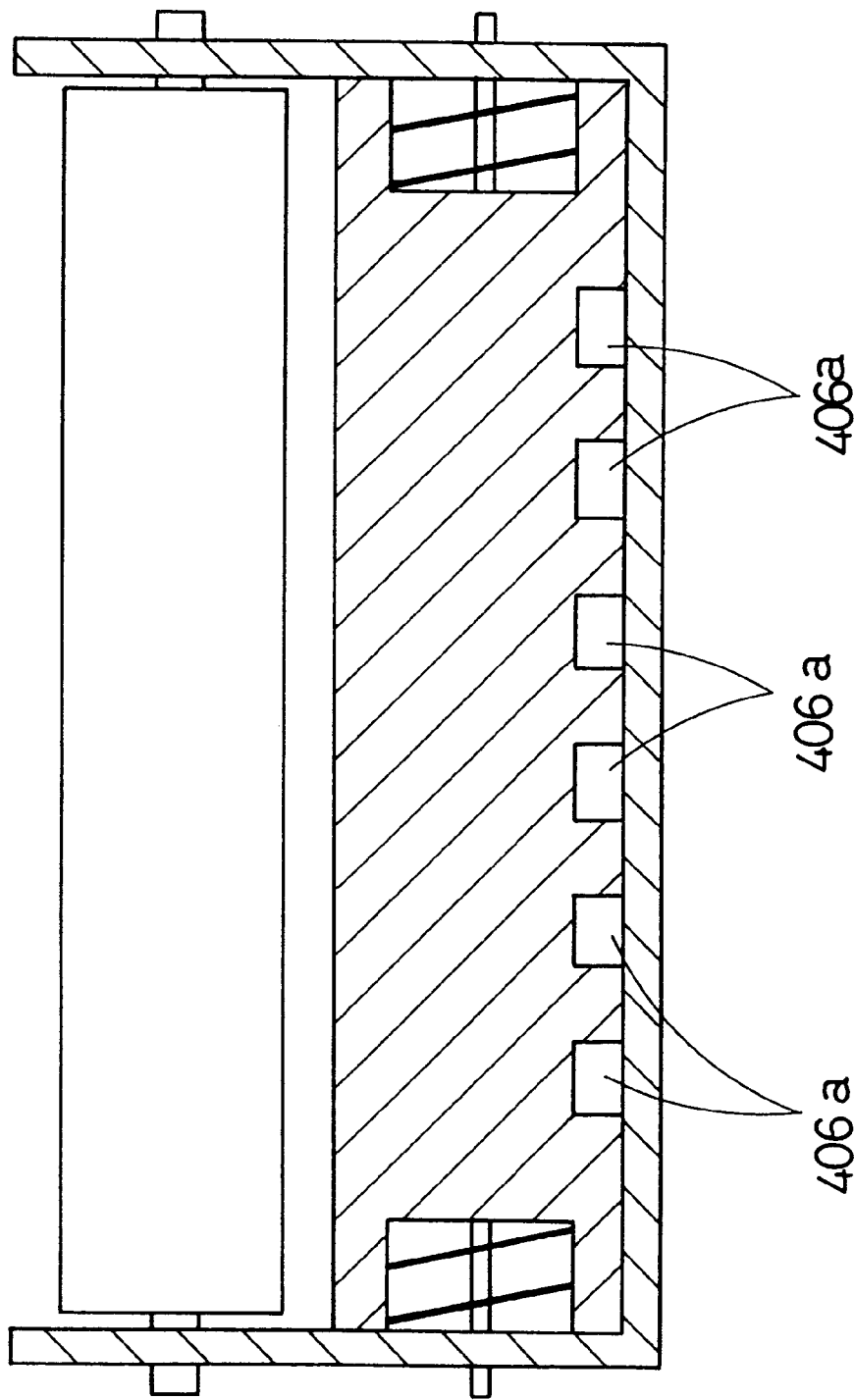
FIG. 33 is a first variant of a developing device according to the seventeenth embodiment.
Figure 34:
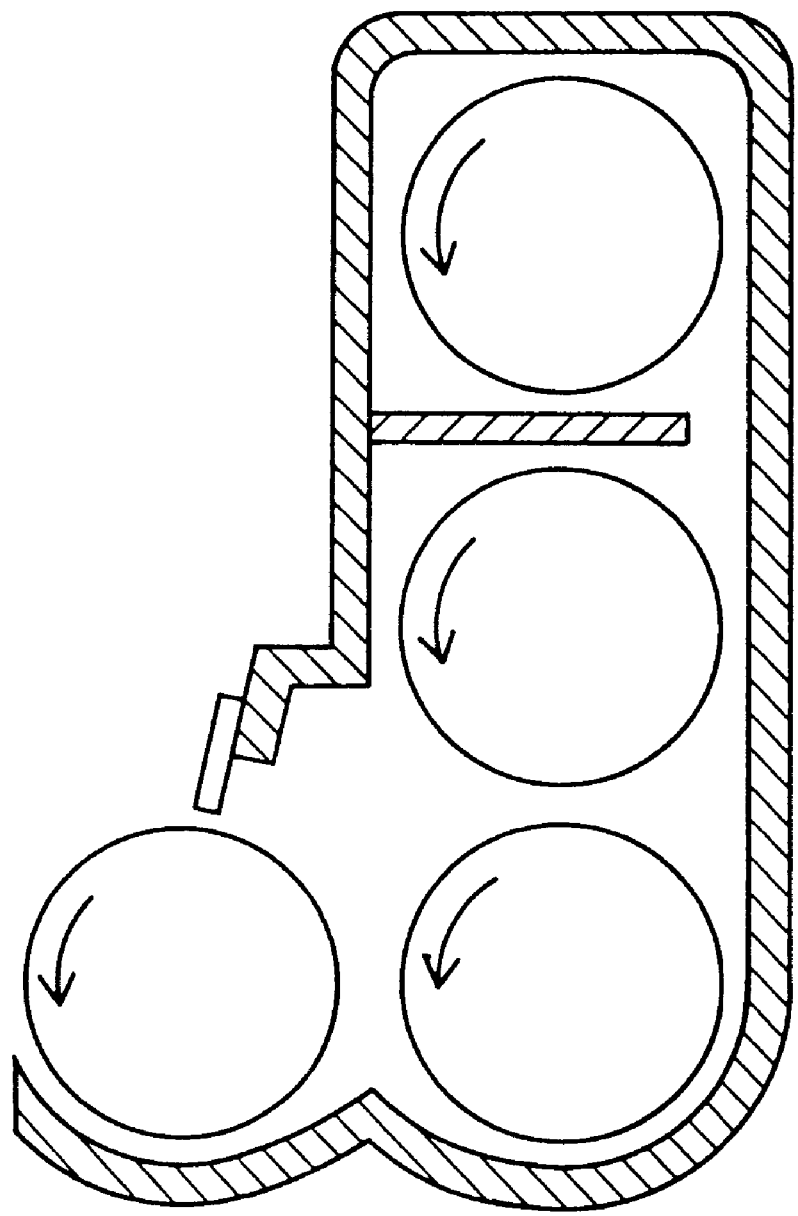
FIG. 34 is a second variant of a developing device according to the seventeenth embodiment.

As shown in FIG. 33, plurality of passing portions 406a may be arranged at equal spaces. Further, the manner described in the present embodiment is applicable to a tri-axial circulation type developing device shown in FIG. 34.

[The Eighteenth Embodiment]

Figure 35:
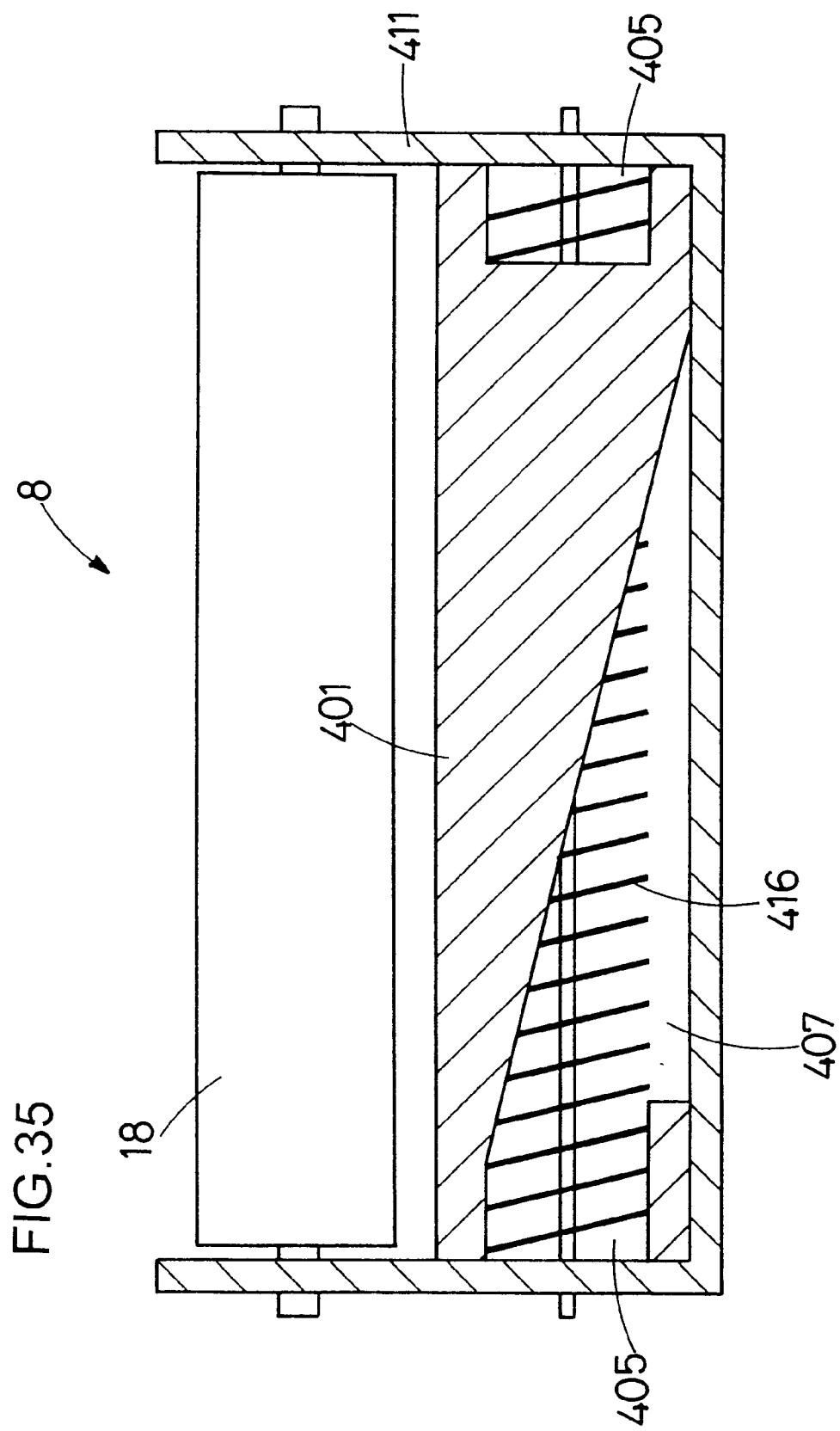
FIG. 35 is a cross sectional plane view of a developing device according to the eighteenth embodiment.

The eighteenth embodiment will be explained. In a developing device 8 according to the eighteenth embodiment, form of a passing portion arranged at a partition wall is modified. That is, as shown in FIG. 35, in the developing device 8, a passing portion 407 opens wider toward the downstream side of developer-transporting direction for the stirring screw 414 (left side in FIG. 35). Further, opening portions 405 are arranged at both ends of a partition wall 401. However, an opening portion 405 at left side in FIG. 35 connects to the passing portion 407. Other than this point, structure of the developing device of the eighteenth embodiment is same as that of the developing device of the seventeenth embodiment.

In the developing device 8, since the opening width of the passing portion 407 opens wider towards the downstream side of the developer-transporting direction for the stirring screw 424, newly replenished toner moves to a supply screw 416 after fully stirred by the stirring screw 414. That is, even if toner is newly supplied, the only toner fully stirred and mixed is supplied to the development roller 18. Thereby, occurrence of unevenness of toner-density, fog of toner or the like is prevented.

[The Nineteenth Embodiment]

Figure 36:
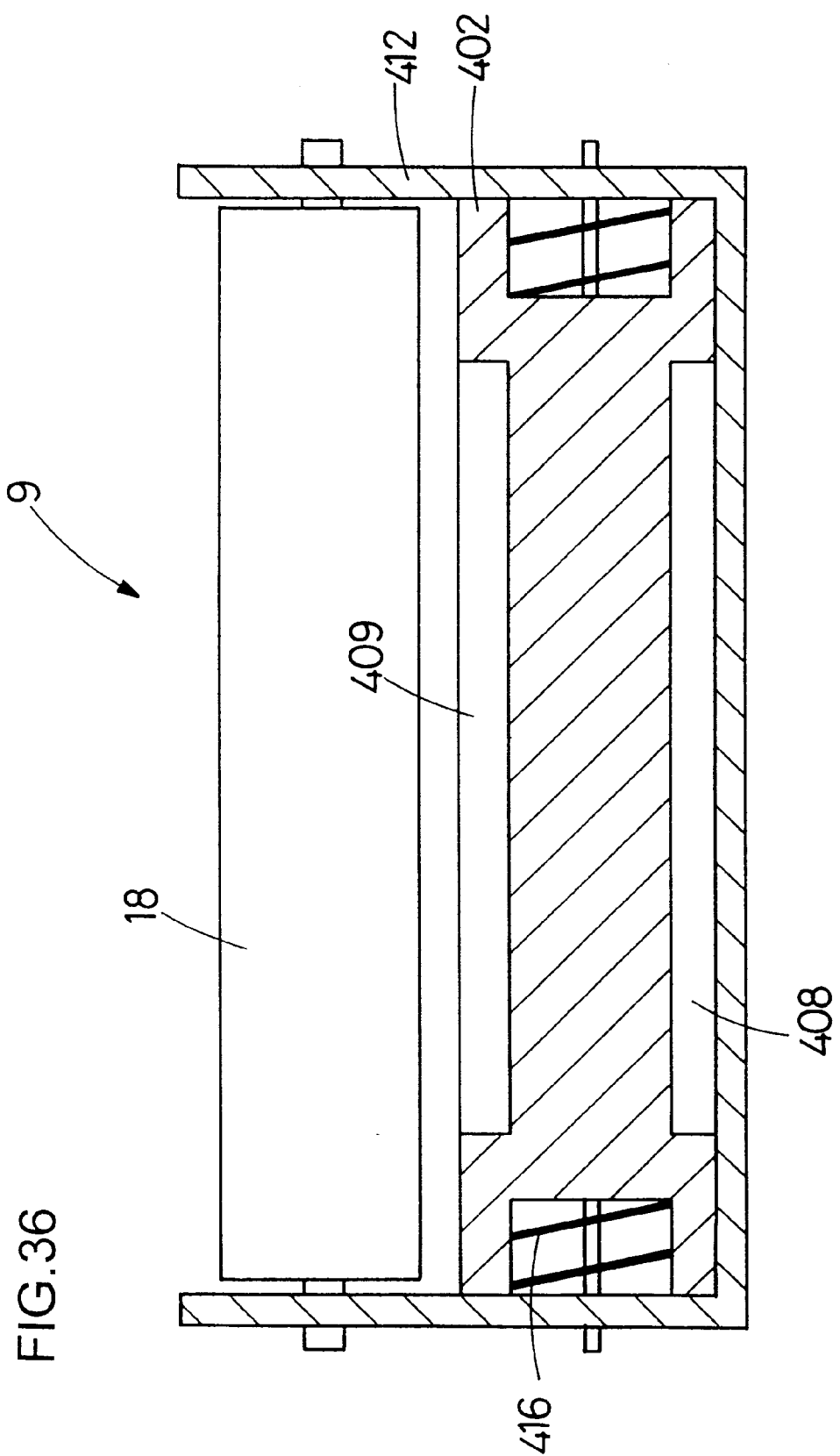
FIG. 36 is a cross sectional plane view of a developing device according to the nineteenth embodiment.

The nineteenth embodiment will be explained. In a developing device 9 according to the nineteenth embodiment, two passing portions are arranged on a partition wall. That is, as shown in FIG. 36, in the developing device 9, a passing portion 408 is arranged at a position which receives upward pressure by rotation of a supply screw 416. Further, a passing portion 409 is arranged at a position which receives downward pressure by rotation of a stirring screw 414. Other than this point, structure of the developing device of the eighteenth embodiment is same as that of the developing device of the seventeenth embodiment.

In the developing device 9, passing portions (408, 409) are arranged at positions which receive upward pressure by rotation of the supply screw 416 and downward pressure by rotation of the stirring screw 414. Thereby, developer smoothly moves between the stirring screw 414 and the supply screw 416 and amount of moving developer is almost equivalent. Accordingly, developer can properly move between the screws while being transported by the stirring screw 414 or the supply screw 416.

Therefore, developer is prevented from staying and balance of developer-transporting capabilities between the two screws is kept. Further, since the partition wall 402 is arranged immediately below the stirring screw 414, excessive movement of developer, wherein developer moves from the stirring screw 414 to the supply screw 416 due to gravity, is restrained. Thereby, developer not sufficiently stirred and mixed is never supplied to the development roller 18. Thus, increase of driving torque and occurrence of unevenness of toner-density, fog of toner or the like are prevented.

[The Twentieth Embodiment]

Figure 37:
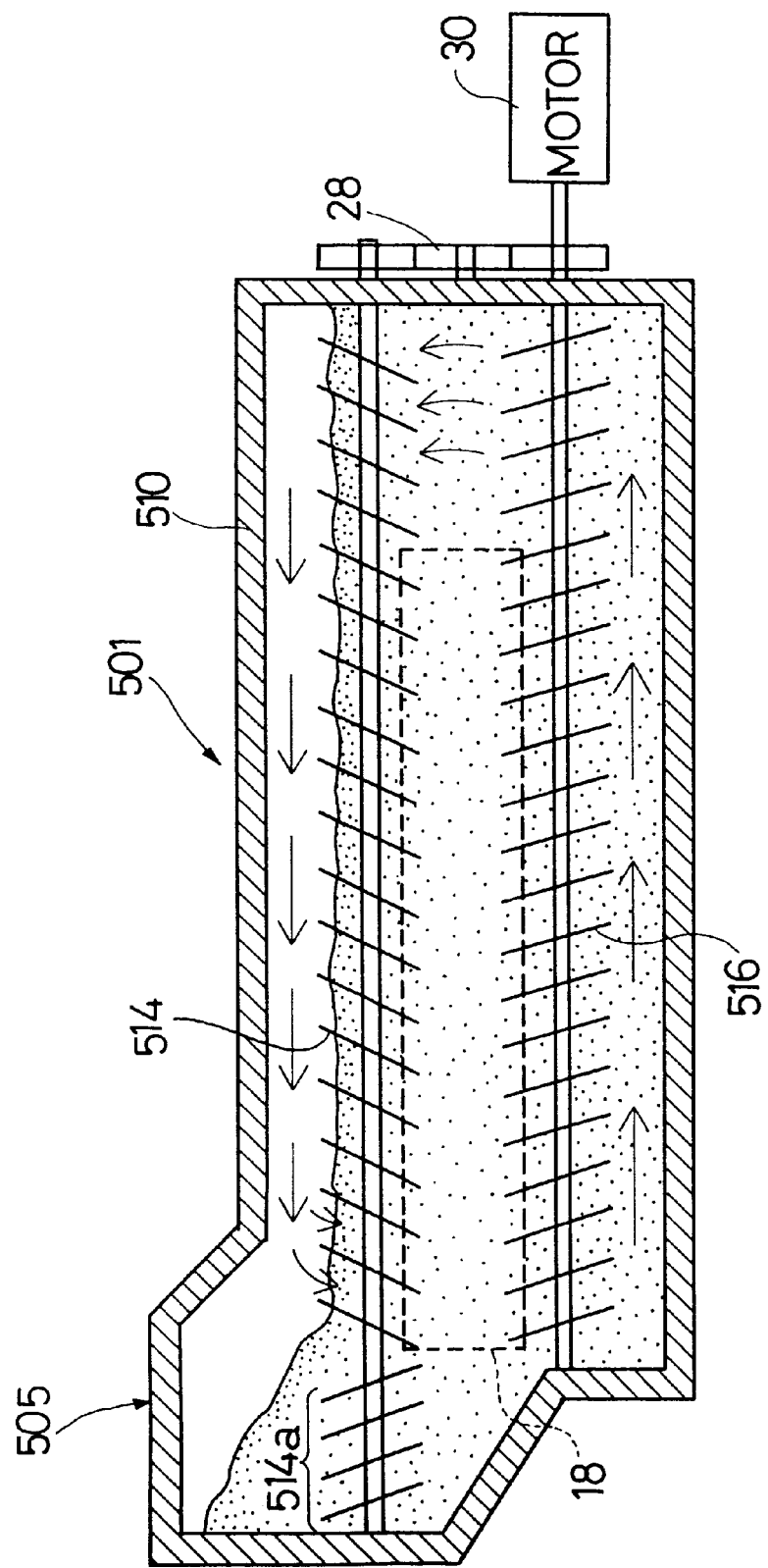
FIG. 37 is a cross sectional front view of a developing device according to the twentieth embodiment.

The twentieth embodiment will be explained. In a developing device 501 according to the twentieth embodiment, as shown in FIG. 37, a developer reservoir portion 505 for reserving developer is arranged as a part of a developer accommodating unit 510. The developer reservoir portion 505 is located at downstream side of developer-transporting direction for a supply screw 514. Inside the developer reservoir portion 505, rotating axis of the supply screw 514 extends there. At the extended part, reverse winding portion 514a is arranged: slanting direction of screw blades at the extended part is reverse to that of screw blades of the supply screw 514.

In the developing device 501, about three-quarters of the supply screw 514 located at upper part of the developer accommodating unit 510 is buried with developer. Therefore, entire part of the collecting screw 516 located at lower part is buried with developer. Excessive developer not directly circulated by the collecting screw 516 is reserved at the developer reservoir portion 505.

The developing device 501 uses two-component developer composed of toner and carrier wherein toner-density of developer (proportion of toner weight to entire developer) is kept within a certain range. Normally, toner density is controlled to be around Tc=6% and its tolerable range of variation is of about ±2%. Influence on bulk of developer which is brought by variation of toner density within the tolerable range will be explained by the Table 1 below. The Table 1 shows bulk density of developer at each toner-density. The bulk density herein is volume including empty spaces where no particle is present and bulk density is a value obtained when mass of particles is divided by bulk.

TABLE 1

| Tc | Bulk Density |
|----|--------------|
| 4% | 2.05 g/cm³ |
| 6% | 1.93 g/cm³ |
| 8% | 1.8 g/cm³ |

Bulk of developer can be calculated from the bulk density indicated in the Table 1. Then, bulk of developer at each toner density to 100 grams of carrier will be shown in the Table 2 below. As apparent from the Table 2, bulk of developer varies in response to variation of toner-density. That is, when toner-density drops, bulk of developer is decreases. Vice versa, when toner-density rises, bulk of developer increases.

TABLE 2

| Tc | Amount of carrier | Amount of Toner | Amount of Developer | Bulk of Developer |
|----|-------------------|-----------------|---------------------|-------------------|
| 4% | 100 g | 4.2 g | 104.2 g | 50.8 cm³ |
| 6% | 100 g | 6.4 g | 106.4 g | 55.1 cm³ |
| 8% | 100 g | 8.7 g | 108.7 g | 60.4 cm³ |

Figure 38:
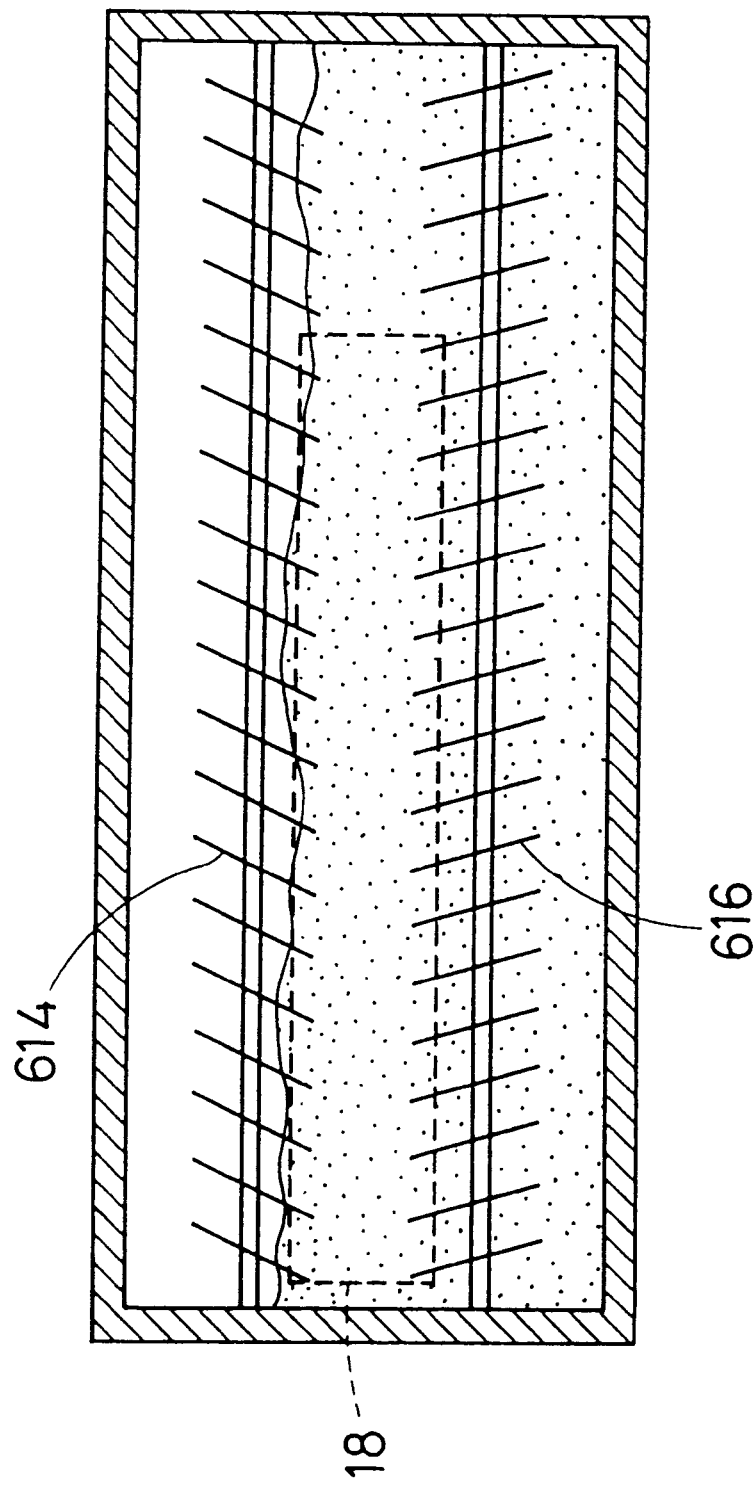
FIG. 38 is a schematic diagram for explaining phenomena which occur to a typical developing device when its developer-bulk reduces.
Figure 39:
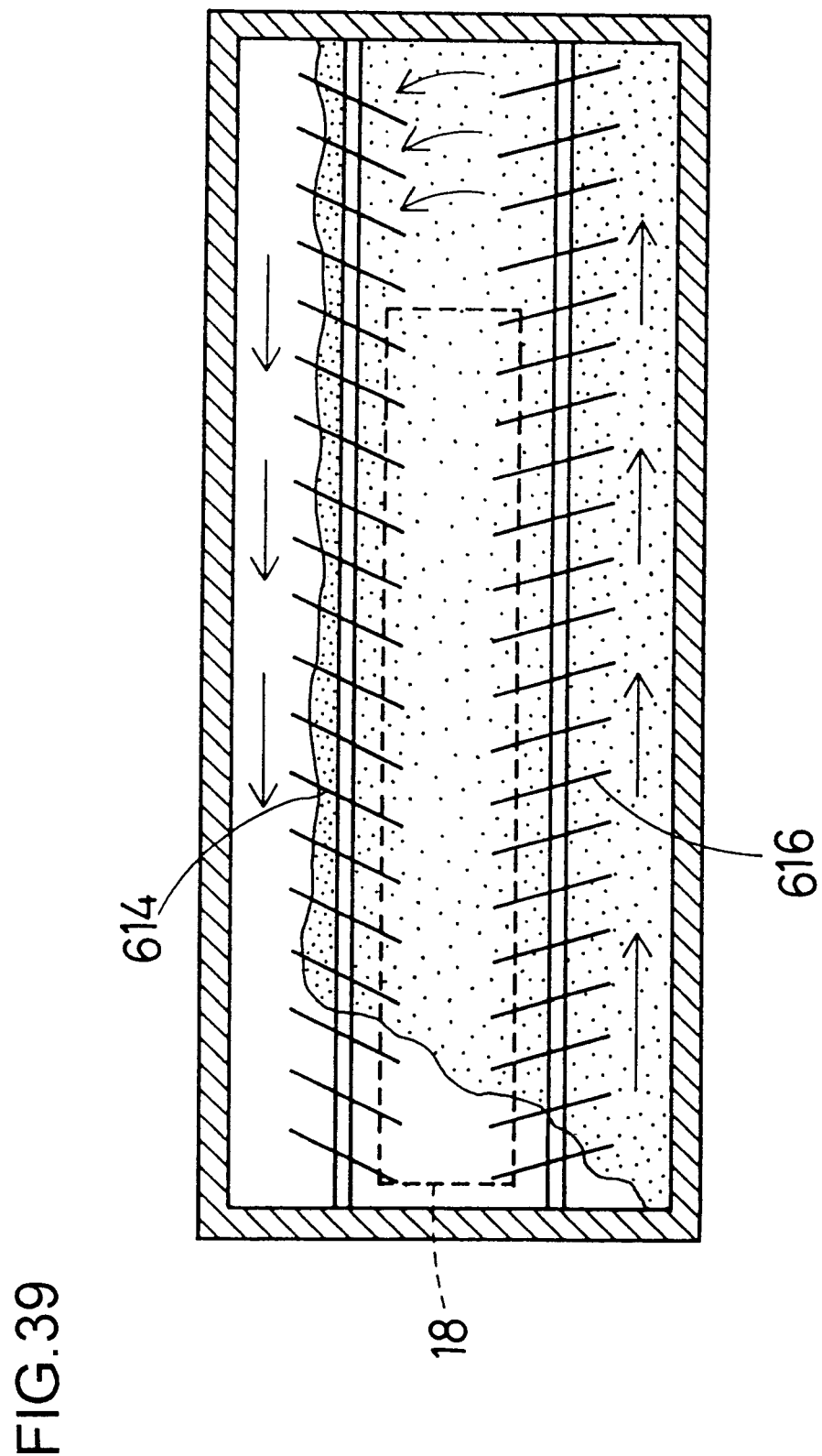
FIG. 39 is a schematic diagram illustrating actual distribution of developer which can be observed in a typical developing device when its developer-bulk reduces.

In a developing device without a developer reservoir portion 505, when bulk of developer decreases due to variation of toner-density, level of developer present around the upper screw 614 goes down, as shown in FIG. 38. Therefore, amount of developer transported by the upper screw 614 decreases. On the other hand, since the lower screw 616 is still entirely buried with developer, amount of developer to be transported by the lower screw 616 does not vary. As a result, level of developer at the upper screw 614 goes up so that transporting speed of developer by each screw, i.e., the upper screw 614 and the lower screw 616 should be equal. Subsequently, as shown in FIG. 39, circulating width of developer becomes short in longitudinal direction, whereby developer is not supplied to the development roller 18 uniformly.

Figure 40:
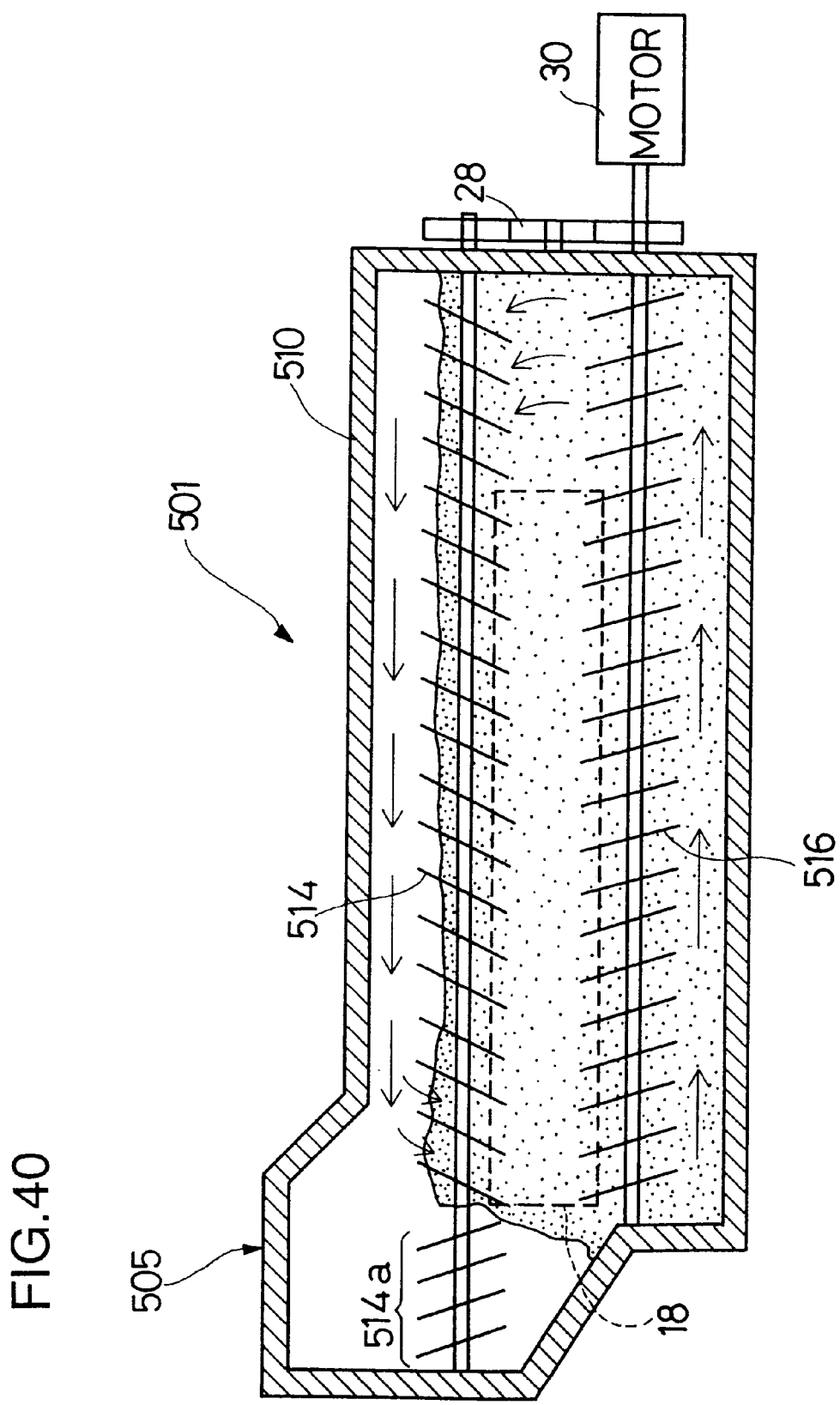
FIG. 40 is a schematic diagram illustrating distribution of developer which can be observed in a developing device according to FIG. 37 when its developer-bulk reduces.

However, in the developing device 501, when bulk of developer decreases, developer present at the developer reservoir portion 505 is replenished to the supply screw 514 side, as shown in FIG. 40. Thereby, level of developer within a developer accommodating unit 510 is always constant to keep balance of developer between the upper screw and the lower screw. Therefore, circulating width of developer never becomes short in longitudinal direction. Moreover, the developer reservoir portion 505 lessens stress applied to developer.

Further, such a screw blade as used at a reverse winding portion 514a does not have to be arranged within the developer reservoir portion 505: just rotating axis of the supply screw 514 may be extended to the developer reservoir portion 505. Moreover, the developer reservoir portion 505 of FIG. 37 protrudes in both longitudinal and latitudinal directions, however, it may protrudes in either longitudinal direction or latitudinal direction. In case that the developer reservoir portion 505 is made to protrude in latitudinal direction only, a rotating axis and screw blades do not have to be arranged. Further, a developer reservoir portion may be applied to a tri-axial circulation type developing device.

[The Twenty-first Embodiment]

Figure 41:
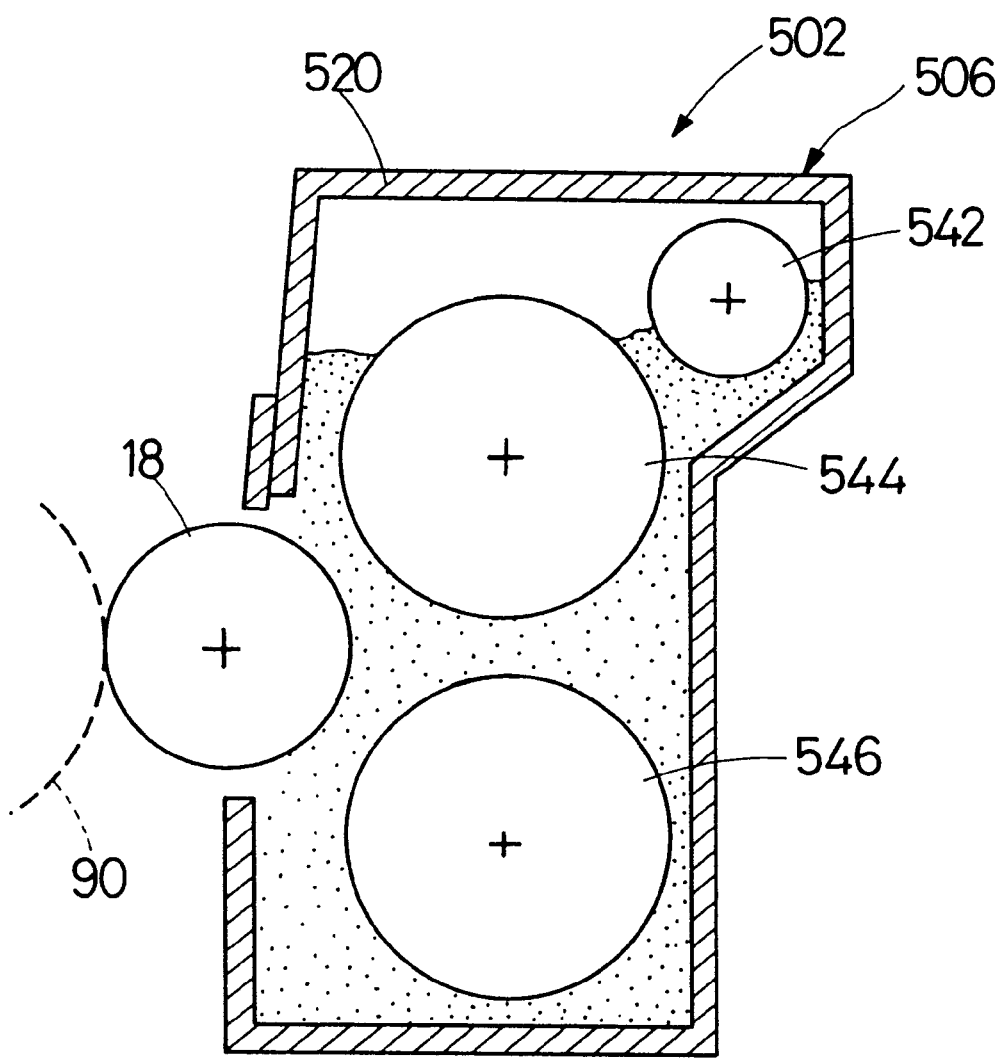
FIG. 41 is a cross sectional side view of a developing device according to the twenty-first embodiment.
Figure 42:
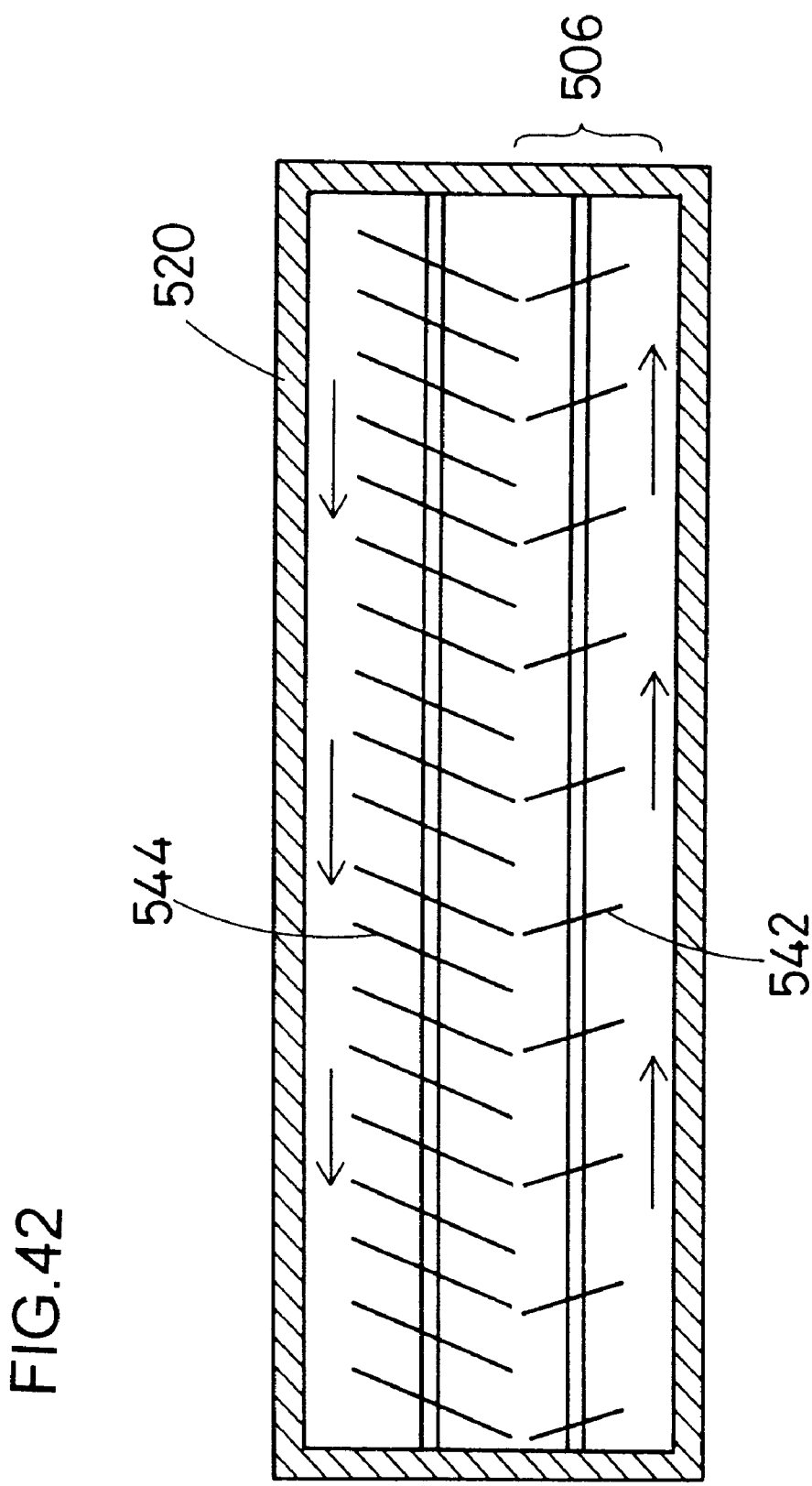
FIG. 42 is a cross sectional plane view of a developing device according to FIG. 41.

Finally, the twenty-first embodiment will be explained. In a developing device 502 according to the twenty-first embodiment, as shown in FIGS. 41 and 42, a developer reservoir portion 506 is arranged at obliquely above a supply screw 544 extending in an entire width direction of a developer accommodating unit 520. The developer reservoir portion 506 is located at the opposite side of a development roller 18. A transporting screw 542 is arranged within the developer reservoir portion 506. A position where an axis core of the transporting screw 542 is located is higher than a position where that of the supply screw 544 is located. Further, transporting direction of the transporting screw 542 is reverse to that of the supply screw 544.

In the developing device 502, when a collecting screw 546, the supply screw 544 and the transporting screw 542 rotate to have developer circulate, a main circulation path of developer is formed by the supply screw 544 and the collecting screw 546. Moreover, a sub-circulation path of developer is formed by the supply screw 544 and the transporting screw 542 (see FIG. 42). Developer is supplied to a development roller 18 through the main circulation path of developer.

Figure 43:
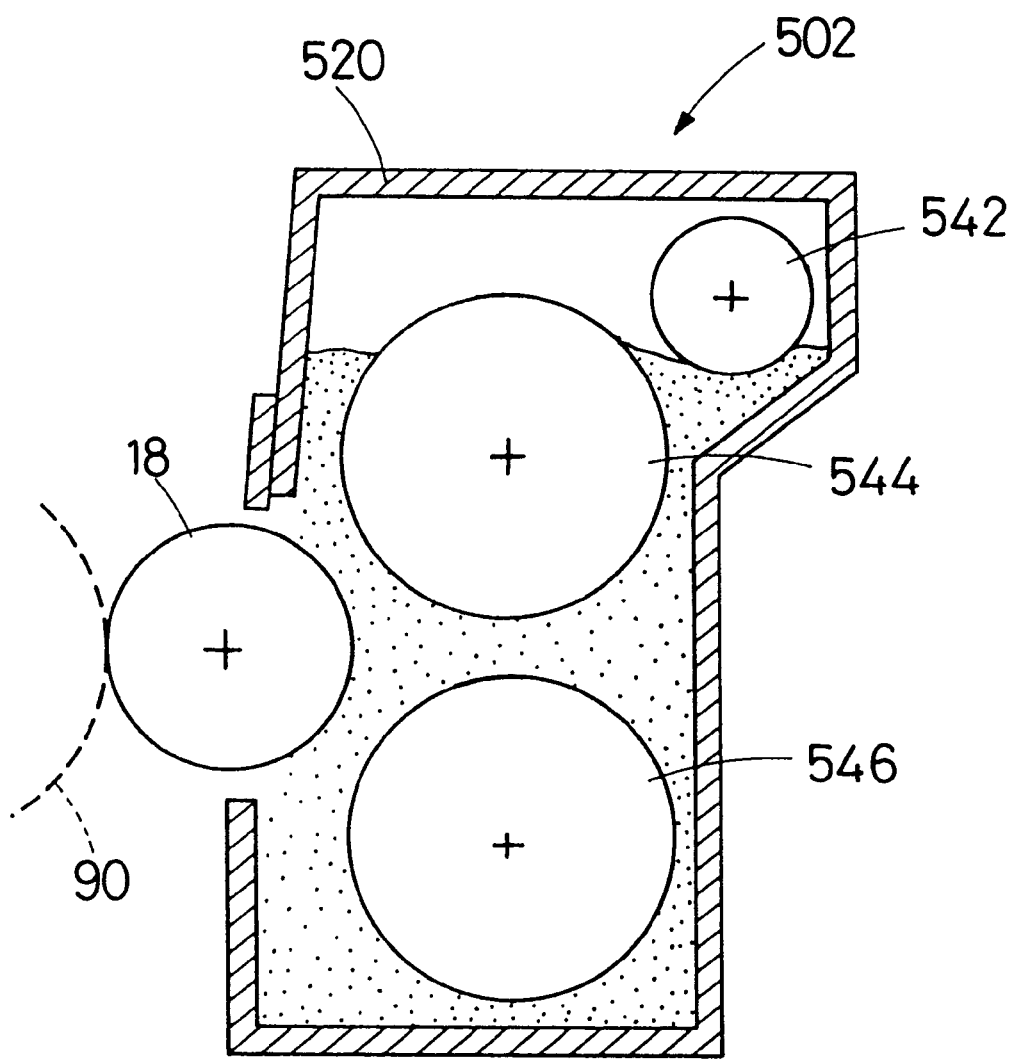
FIG. 43 is a schematic diagram illustrating distribution of developer which can be observed in a developing device according to FIG. 41 when its developer-bulk reduces.
Figure 44:
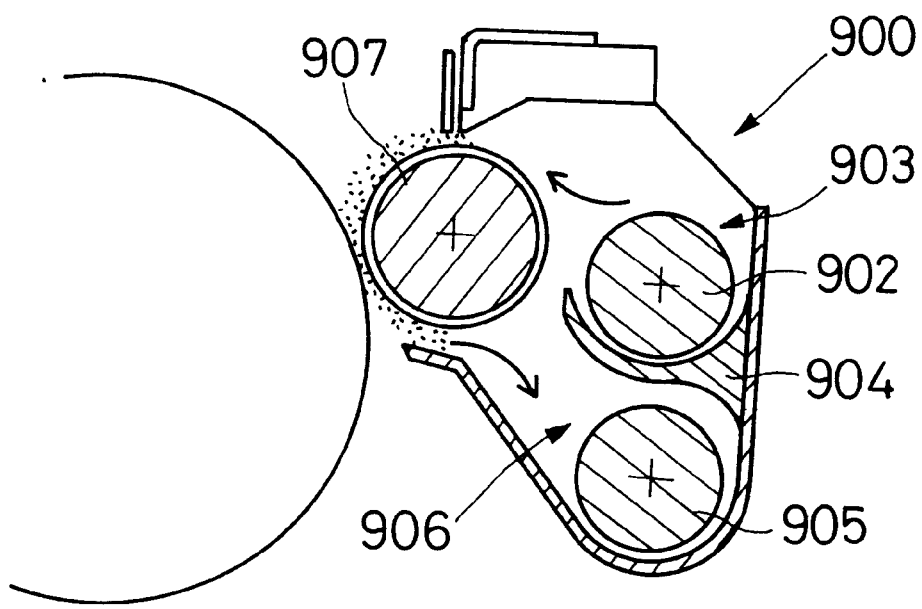
FIG. 44 is a cross sectional side view of a conventional developing device.
Figure 45:
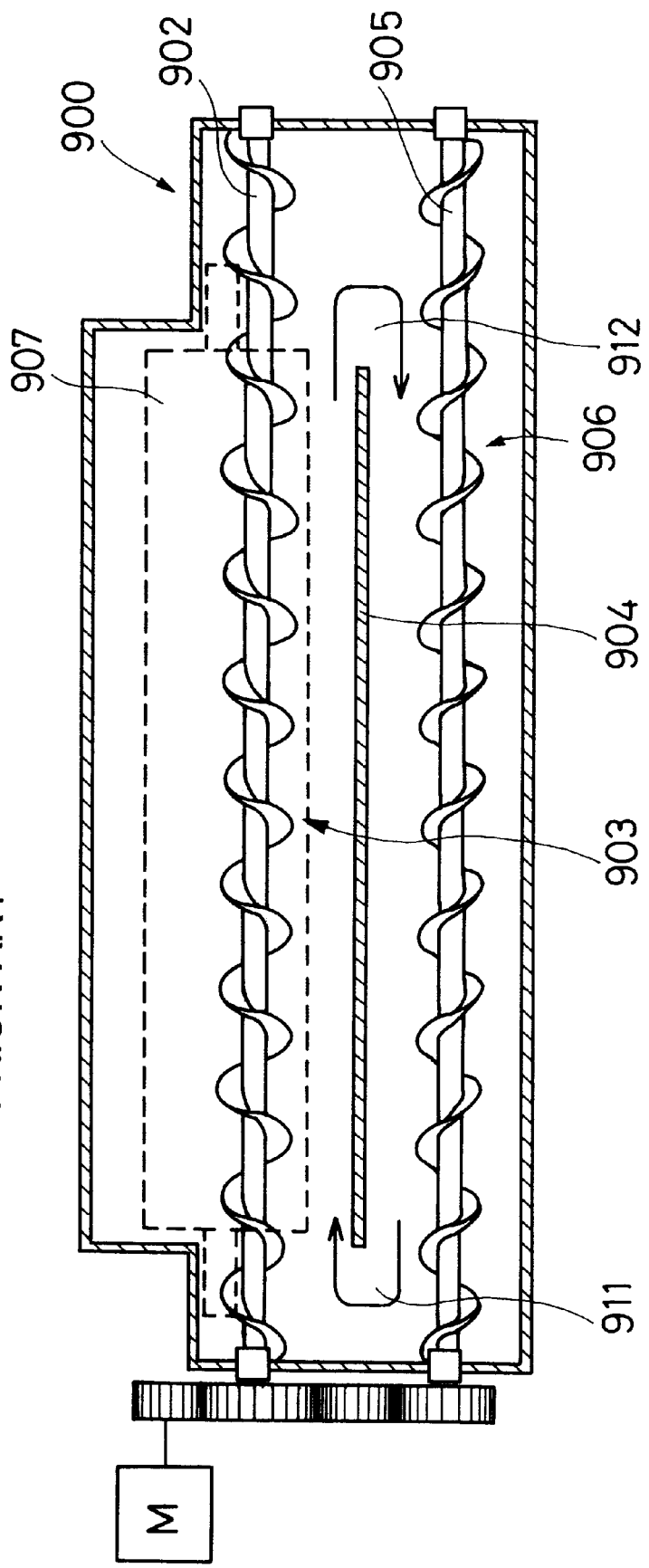
FIG. 45 is a cross sectional front view of a conventional developing device according to FIG. 44.

In the developing device 502, between developer transported by the supply screw 544 and the transporting screw 542 and developer transported by the collecting screw 546, balance of developer is kept. When toner-density varies and bulk of developer reduces, developer present within the developer reservoir portion 506 (the transporting screw 542) is supplied to the supply screw 544. Then, as shown in FIG. 43, as amount of developer to be transported by the transporting screw 542 reduces, developer to be transported by the supply screw 544 increases. Accordingly, level of developer transported by the supply screw 544 is kept constant.

Thus, between developer for the supply screw 544 and developer for collecting screw 546, balance of developer is kept. Therefore, it is prevented that circulating width of developer in a longitudinal direction becomes short, whereby developer is supplied to the development roller 18 spreading in an entire longitudinal direction. Thereby, insufficient supply of developer to the development roller 18 is prevented.

The developer-transporting direction of the transporting screw 542 may be made same as that of the supply screw 544. Further, this manner of arrangement of developer-transporting direction of each screw is applicable to a tri-axial circulation type developing device.

In any of the aforementioned embodiments, plurality of screws are arranged up and down. Therefore, dimension of a developing device is small in a thickness direction of the developing device (for example, referring to FIG. 2, a left and right direction). Therefore, a developing device of each embodiment is suitable for a tandem type image forming device wherein plurality of image forming portions are arranged horizontally. That is, in a tandem type image forming device, each image forming portion is equipped with a developing device. Therefore, entire dimension of an image forming device is determined by thickness of a developing device. Accordingly, use of developing devices of aforementioned embodiments can contribute to miniaturization of a tandem type image forming device.

Since structures of tandem type image forming devices are disclosed in U.S. Pat. No. 5,345,353, U.S. Pat. No. 5,477,250, for example, please refer to these U.S Patents for details. Explanation on the structures is omitted in this specification.

What is claimed is:

1. A developing device for developing an electrostatic latent image formed on a photoreceptor said developing device comprising:

an accommodating unit which accommodates developer therein, said developer being a mixture of toner and carrier;

a developer supporting member which is located in said accommodating unit and is located opposite to the photoreceptor;

a first transporter which is located in said accommodating unit and is faced to the developer supporting member, said first transporter being for transporting the developer, said first transporter having a first transporting capability; and a second transporter, which is located in said accommodating unit and is located above of said first transporter, said second transporter being for transporting the developer, said second transporter having a second transporting capability higher than said first transporting capability.

2. A developing device of claim 1, wherein said first transporter is completely buried in the developer, and said second transporter is partially buried in the developer.

3. A developing device of claim 1, wherein said first transporter and said second transporter are a first auger and a second auger, respectively.

4. A developing device of claim 3, wherein said first auger and said second auger are rotated at a first speed and a second speed, respectively, said first speed being lower than said second speed.

5. A developing device of claim 3, wherein said first auger and said second auger have a first diameter and a second diameter, respectively, said first diameter being smaller than said second diameter.

6. A developing device of claim 3, wherein said first auger and said second auger are provided at a first pitch and a second pitch, respectively, said first pitch being smaller than said second pitch.

7. A developing device of claim 3, wherein said first auger and said second auger have a first number of threads and a second number of threads, respectively, said first number of threads being smaller than said second number of threads.

8. A developing device of claim 3, wherein said first auger ha s a paddle.

9. A developing device of claim 8, wherein said second auger has a paddle, and an area of said paddle of said second auger is smaller than an area of said paddle of said first auger.

10. A developing device of claim 3, wherein said first auger and said second auger have a first rod with a first diameter and a second rod with a second diameter, respectively, said first diameter being larger than said second diameter.

11. A developing device of claim 1, wherein said accommodating unit has a first end and a second end opposing said first end, said first transporter transports the developer from said first end to said second end, and said second transporter transports the developer from said second end to said first end.

12. A developing device of claim 11, wherein said first transporter delivers the developer to said second transporter at said second end, and said second transporter delivers the developer to said first transporter at said first end.

13. A developing device of claim 12, wherein said accommodating unit has a space through which the developer is able to pass between said first transporter and said second transporter, and said space is located between said first end and said second end.

14. A developing device for developing an electrostatic latent image formed on a photoreceptor;

said developing device comprising:

an accommodating unit which accommodates developer therein, said developer being a mixture of toner and carrier, said accommodating unit having a first end and a second end opposing said first end;

a developer supporting member which is located in said accommodating unit and is located opposite to the photoreceptor;

a first transporter which is located in said accommodating unit to transport the developer from said first end to said second end, said first transporter being faced to the developer supporting member; and a second transporter, which is located in said accommodating unit and is located above of said first transporter to transport the developer from said second end to said first end, wherein at an area between said first end and said second end, a first pressure to transfer developer from said second transporter to said first transporter is larger than a second pressure to transfer developer from said first transporter to said second transporter.

15. A developing device of claim 14, wherein said area is located closer to said first end than to said second end.

16. A developing device of claim 15, wherein said second transporter is an auger.

17. A developing device of claim 16, wherein said auger has a paddle in said area.

18. A developing device of claim 16, wherein said auger has a first pitch in said area and has a second pitch at other than said area, said first pitch is smaller than said second pitch.

19. A developing device of claim 16, wherein said auger has a first number of threads in said area and has a second number of threads at other than said area, said first number of threads is larger than said second number of threads.

20. A developing device of claim 15, wherein said first transporter and said second transporter are a first auger and a second auger, respectively.

21. A developing device of claim 20, wherein said second auger has a paddle in said area.

22. A developing device of claim 20, wherein said first auger has a first pitch in said area and said second auger has a second pitch in said area, said second pitch is smaller than said first pitch.

23. A developing device of claim 20, wherein said first auger has a first number of threads in said area and said second auger has a second number of threads in said area, said second number of threads is larger than said first number of threads.

24. A developing device for developing an electrostatic latent image formed on a photoreceptor said developing device comprising:
    an accommodating unit which accommodates developer therein, said developer being a mixture of toner and carrier, said accommodating unit having a first end and a second end opposing said first end;
    a developer supporting member which is located in said accommodating unit and is located opposite to the photoreceptor;
    a first auger which is located in said accommodating unit and is faced to the developer supporting member, said first auger being capable of rotating in a first rotating direction to transport the developer along with a rotating axis of said first auger; and
    a second auger which is located in said accommodating unit and is located above of said first auger, said second auger being capable of rotating in a second rotating direction to transport the developer along with a rotating axis of said second auger,
    wherein said accommodating unit has at least one space through which the developer is substantially able to transfer between said first auger and said second auger, said at least one space being located between said first end and said second end.

25. A developing device of claim 24, wherein said first rotating direction and said second rotating direction are different.

26. A developing device of claim 24, wherein said first rotating direction and said second rotating direction are identical.

27. A developing device of claim 24, wherein a phase of said first auger is set to be different from a phase of said second auger.

28. A developing device of claim 24, wherein a distance from said rotating axis of said first auger to said rotating axis of said second auger is smaller than a summation of a radius of said first auger and a radius of said second auger.

29. A developing device of claim 24 has a dispersing member which is arranged at intermediate height of said first auger and said second auger so as to disperse the developer.

30. A developing device of claim 29, wherein said dispersing member is a dispersing auger which transports developer in an axial direction and disperses the developer.

31. A developing device of claim 30, wherein developer-transporting direction of said dispersing auger and that of said first auger is opposite.

32. A developing device of claim 29, wherein said dispersing member is a regulating member for regulating flow of developer.

33. A developing device of claim 24, wherein said accommodating unit comprises a partition wall with at least one opening, said partition wall being located between said first auger and said second auger, and between said first end and said second end, said at least one opening comprising said at least one space.

34. A developing device of claim 33, area of said opening is within a range between 10 and 50 percent of entire area of said partition wall.

35. A developing device of claim 24, wherein said first transporter delivers the developer to said second transporter at said second end, and said second transporter delivers the developer to said first transporter at said first end.

36. A developing device for forming an image with toner, said developing device comprising:
    an accommodating unit which accommodates developer therein, said developer being a mixture of toner and carrier, said accommodating unit having a first end and a second end opposing said first end;
    a first transporter which is located in said accommodating unit, said first transporter transporting the developer from said first end to said second end; and
    a second transporter which is located in said accommodating unit and is located above of said first transporter, said second transporter transporting the developer from said second end to said first end,
    wherein said first transporter delivers the developer to said second transporter at said second end, and said second transporter delivers the developer to said first transporter at said first end, and said accommodating unit has a space for storing an excessive amount of the developer in said accommodating unit.

37. A developing device of claim 36, wherein said space is provided at said first end.

38. A developing device of claim 37, wherein said second transporter is a first auger and additionally has a second auger, said second auger is located at said space in coaxial to said first auger, and transports developer in reverse to said first auger does.

39. A developing device of claim 36 further comprising:
    a third transporter located in said space, wherein an axis of said third transporter is located at a position which is higher than a position where an axis of said second transporter is located.

* * * * *